United States Patent
Luh et al.

(10) Patent No.: US 9,831,672 B2
(45) Date of Patent: Nov. 28, 2017

(54) POWER DELIVERY IN A MULTIPLE-OUTPUT SYSTEM

(71) Applicant: Apple Inc., Cupertino, CA (US)

(72) Inventors: Louis Luh, Sunnyvale, CA (US); William C. Athas, San Jose, CA (US); Heather R. Sullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 14/733,186

(22) Filed: Jun. 8, 2015

(65) Prior Publication Data

US 2016/0099564 A1    Apr. 7, 2016

Related U.S. Application Data

(60) Provisional application No. 62/009,099, filed on Jun. 6, 2014, provisional application No. 62/042,608, filed on Aug. 27, 2014.

(51) Int. Cl.
| | |
|---|---|
| *H02J 1/14* | (2006.01) |
| *H02J 3/00* | (2006.01) |
| *G06F 1/26* | (2006.01) |
| *H02J 7/00* | (2006.01) |
| *G06F 11/30* | (2006.01) |

(52) U.S. Cl.
CPC ............... *H02J 1/14* (2013.01); *G06F 1/26* (2013.01); *H02J 3/00* (2013.01); *H02J 7/0063* (2013.01); *H02J 7/0065* (2013.01); *G06F 11/3058* (2013.01); *H02J 2007/0067* (2013.01); *Y10T 307/406* (2015.04)

(58) Field of Classification Search
CPC . H02J 1/14; H02J 2007/0067; Y10T 307/406; G06F 11/3058
See application file for complete search history.

(56) References Cited

U.S. PATENT DOCUMENTS

| | | | |
|---|---|---|---|
| 8,049,472 | B2 | 11/2011 | Easwaran |
| 2005/0084721 | A1 | 4/2005 | Ikuma |
| 2008/0297128 | A1 | 12/2008 | Xu |
| 2013/0193755 | A1* | 8/2013 | Chang ............... H02J 1/10 307/18 |

\* cited by examiner

*Primary Examiner* — Robert Deberadinis
(74) *Attorney, Agent, or Firm* — Blank Rome LLP

(57) ABSTRACT

The disclosed embodiments provide a system that operates a power supply. During operation, the system disposes a first switching mechanism between a first output of a first power converter and two or more loads. Next, the system obtains two or more error signals for the two or more loads, wherein each error signal from the two or more error signals represents a difference between a load voltage of a load from the two or more loads and a first reference voltage for the load from a first set of reference voltages for driving the two or more loads using the first power converter. The system then uses the first switching mechanism to couple the load with a largest error signal from the two or more error signals to the first output.

24 Claims, 21 Drawing Sheets

US 9,831,672 B2

POWER DELIVERY IN A MULTIPLE-OUTPUT SYSTEM

RELATED APPLICATION

This application claims the benefit of U.S. Provisional Application No. 62/009,099, entitled "Power Delivery in a Multiple-Output System," by inventor Louis Luh, filed 6 Jun. 2014, which is hereby incorporated by reference.

This application claims the benefit of U.S. Provisional Application No. 62/042,608, entitled "Power Delivery in a Multiple-Output System," by inventor Louis Luh, filed 27 Aug. 2014, which is hereby incorporated by reference.

The subject matter of this application is related to the subject matter in a non-provisional application by inventors Louis Luh, William C. Athas and Heather R. Sullens filed on the same day as the instant application, entitled "Reconfigurable Multiple-Output Power-Delivery System," having Ser. No. 14/733,211, and filing date 8 Jun. 2015.

BACKGROUND

Field

The disclosed embodiments relate to power-delivery systems. More specifically, the disclosed embodiments relate to power delivery in multiple-output systems.

Related Art

Often, power supplies for electronic devices such as smartphones, tablet computers, laptop computers, and desktop computers are designed to efficiently supply a wide range of power levels for a time-varying load such as a central processing unit (CPU) or graphics processing unit (GPU). However, power supplies designed to work equally well over such a wide range of power demands are typically not as efficient as power supplies optimized to supply power over a narrow range of loads. Additionally, although the control logic for a power supply that can deliver power over a wide range of power demands may be stable at a constant power level, transitioning between output power levels may cause decreased accuracy in the regulated output voltage.

Hence, the use of power supplies may be facilitated by improvements related to their design and configuration.

SUMMARY

The disclosed embodiments provide a system that operates a power supply. During operation, the system disposes a first switching mechanism between a first output of a first power converter and two or more loads. Next, the system obtains two or more error signals for the two or more loads, wherein each error signal from the two or more error signals represents a difference between a load voltage of a load from the two or more loads and a first reference voltage for the load from a first set of reference voltages for driving the two or more loads using the first power converter. The system then uses the first switching mechanism to couple the load with a largest error signal from the two or more error signals to the first output.

In some embodiments, the system also generates a control signal for controlling an output current of the first power converter using a largest value of a half-wave-rectified error signal from the two or more error signals, a sum of positive error signals from the two or more error signals, and/or an on-duration of a logical disjunction signal generated from the two or more error signals.

In some embodiments, the output current is proportional to the control signal.

In some embodiments, the two or more error signals comprise two or more request signals obtained using two or more comparators.

In some embodiments, using the first switching mechanism to couple the load with the largest error signal to the first output comprises coupling the first output to the load associated with a comparator from the two or more comparators that first asserts a request signal representing a lower load voltage for the load than the reference voltage for the load, and maintaining coupling of the first output to the load for a minimum pre-specified time.

In some embodiments, the system also uncouples the first power converter from the two or more loads upon detecting a higher load voltage for each load from the two or more loads than the first reference voltage for driving the load from the two or more loads.

In some embodiments, the system also provides a second power converter with a second output for driving at least one of the two or more loads. Upon detecting a lower load voltage of the load than a second reference voltage for the load from a second set of reference voltages for driving the two or more loads using the second power converter, the system engages the second power converter to supplement the lower load voltage with an output voltage from the second output.

In some embodiments, the system also disposes a second switching mechanism between the second output and the two or more loads, and uses the second switching mechanism to couple the load with the largest error signal to the second output.

In some embodiments, the first power converter has a higher efficiency than the second power converter, and the second power converter has a higher power than the first power converter.

In some embodiments, a first switching frequency is used by the first switching mechanism to couple the load with the largest error signal to the first output, and a second switching frequency that is higher than the first switching frequency is used by the second switching mechanism to couple the load with the largest error signal to the second output.

In some embodiments, the first reference voltage for driving the load using the first power converter is higher than the second reference voltage for driving the load using the second power converter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1A:
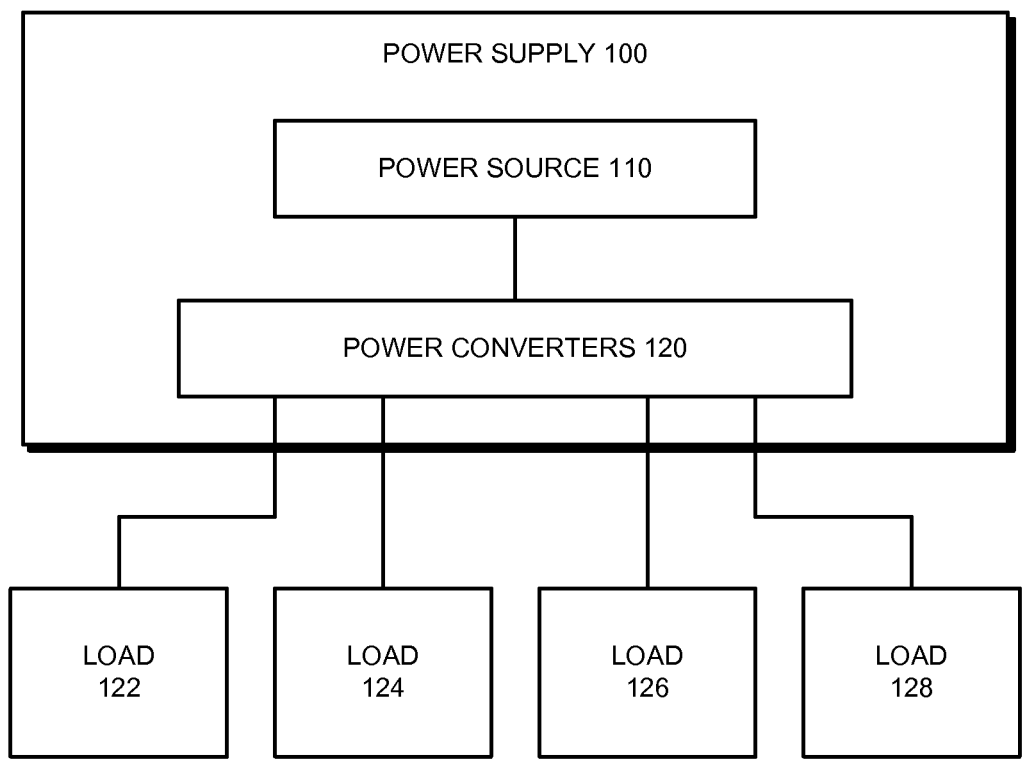
FIG. 1A shows a power supply in accordance with the disclosed embodiments.

The disclosed embodiments provide a power supply for an electronic device. As shown in FIG. 1A, the power supply 100 includes a power source 110 and one or more power converters 120. Power converters 120 may obtain an input voltage or current from power source 110 and convert the input voltage or current into a number of output voltages or currents for use by a number of loads 122-128 in the electronic device. For example, power converters 120 may convert direct current (DC) power from a power adapter acting as power source 110 into low-voltage direct current (DC) that is used to charge a battery and/or power components of a portable electronic device such as a mobile phone, laptop computer, portable media player, and/or tablet computer. When multiple DC power sources are present (e.g., from a power adapter and an external battery), current may be supplied from either or both power sources depending on a number of factors, such as available current from the power adapter. In another example, power source 110 may further include the battery or battery pack in the portable electronic device, such as a lithium-ion and/or lithium-polymer battery pack. Thus, power converters 120 may include buck converters, boost converters, buck-boost converters, single-ended primary-inductor converters (SEPICs), Ćuk converters, and/or class-E DC/DC converters. Power converters 120—may also be configured to convert from alternating current (AC) power to DC power, AC to AC, DC to DC, and DC to AC depending on the types of power provided by power source 110 and/or used by loads 122-128.

In one or more embodiments, power supply 100 delivers power to multiple independent loads (e.g., loads 122-128) in a portable electronic device such as a laptop computer, tablet computer, mobile phone, personal digital assistant (PDA), portable media player, and/or digital camera. Each load may include one or more components, which are powered separately from the component(s) in other loads of the portable electronic device. For example, loads 122-128 may include the central processing unit (CPU), graphics-processing unit (GPU), memory, integrated circuits, radio, ports, and/or other components in the portable electronic device. The components may be grouped into different loads 122-128 based on the voltage, current, and/or power requirements or consumption of the components.

Figure 1B:
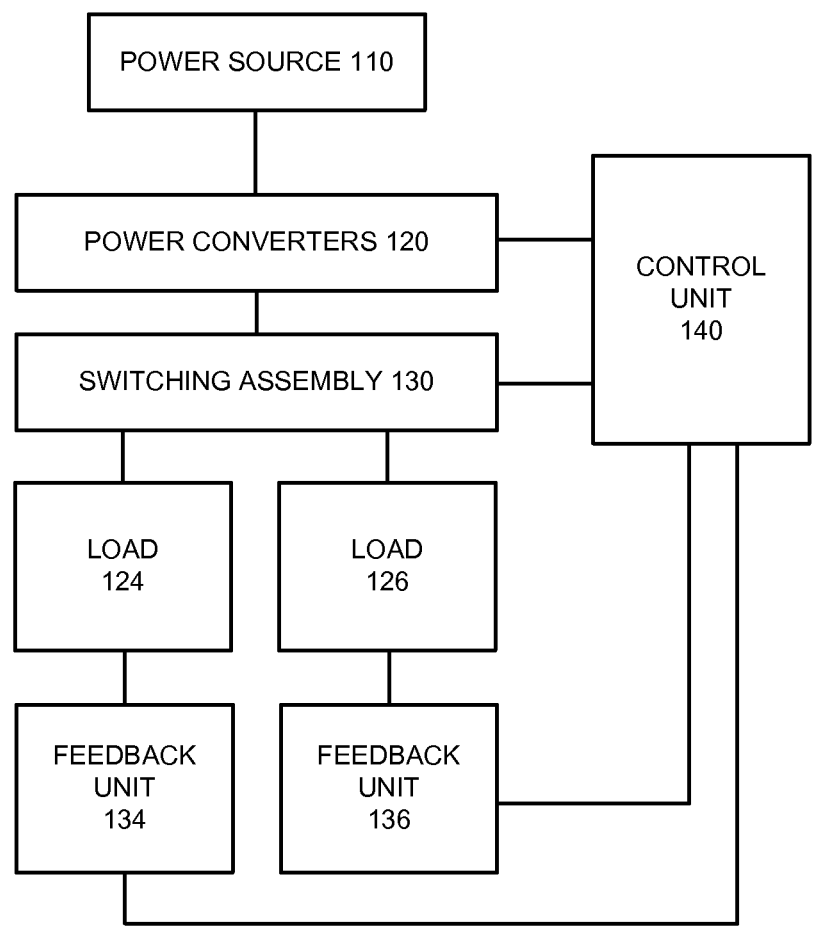
FIG. 1B shows a power supply in accordance with the disclosed embodiments.

In other words, power supply 100 may include functionality to deliver power to a multiple-output system (e.g., for driving multiple loads 122-128) using one or more power converters 120. More generally, as shown in FIG. 1B, power converters 120 may be coupled to multiple loads 124-126 through a switching assembly 130 containing one or more switches. As discussed below, loads 124-126 may be individually coupled to one or more power converters 120, or multiple power converters 120 may be combined into a single output that is used to power multiple loads 124-126. Each load may be coupled to a feedback unit (e.g., feedback units 134-136) that monitors the current, voltage, and/or other aspects of the load. The monitored information may be provided by feedback units 134-136 as feedback signals to a control unit 140 that operates power converters 120 and switching assembly 130 based at least in part on the feedback signals.

Figure 2A:
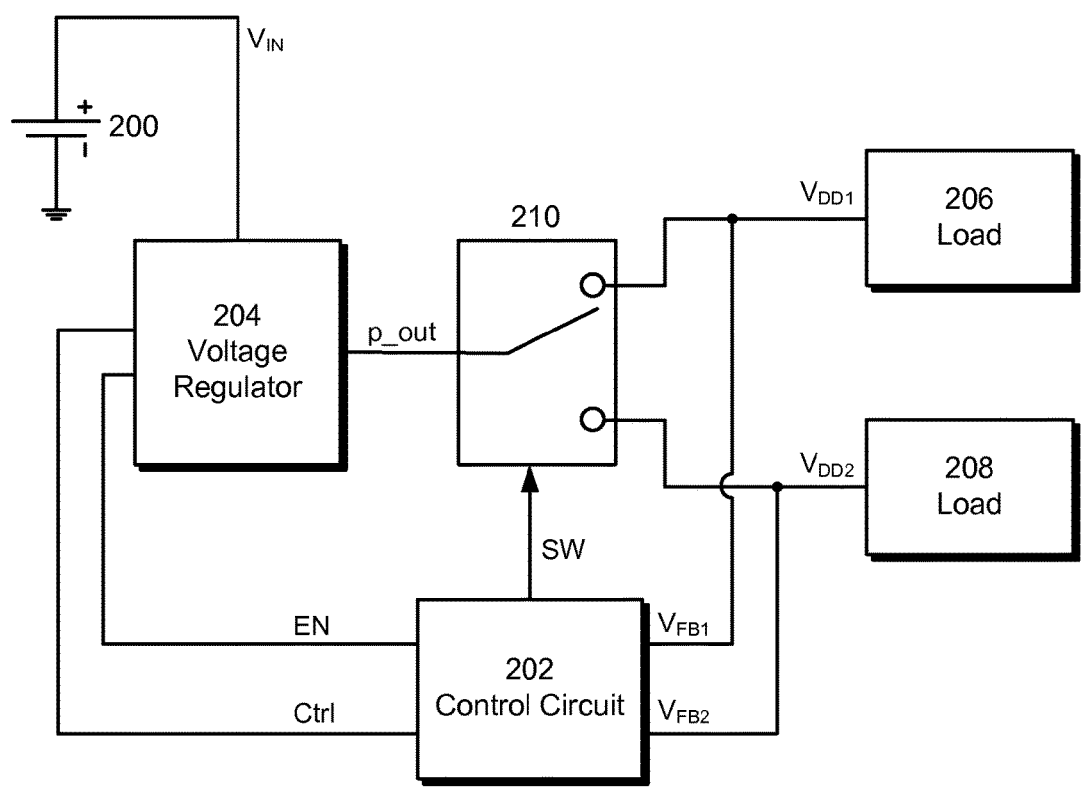
FIG. 2A shows a system for supplying power to components of a portable electronic device in accordance with the disclosed embodiments.

As shown in FIG. 2A, an input voltage (e.g., "$V_{IN}$") is supplied from a power source 200 such as a battery for a portable electronic device and/or a power adapter. The input voltage may be converted into two load voltages (e.g., "$V_{DD1}$" and "$V_{DD2}$") for driving two loads 206-208 respectively using a control circuit 202, a voltage regulator 204 and/or other type of power converter, and a switching mechanism 210. Consequently, the circuit of FIG. 2A may provide a single-input, multiple-output (SIMO) power supply with one input voltage and two output and/or load voltages.

More specifically, an input of voltage regulator 204 is coupled to the input voltage, and loads 206-208 are alternately coupled to an output (e.g., "p_out") of voltage regulator 204 via switching mechanism 210. Control circuit 202 may generate a switching signal (e.g., "SW") that controls switching mechanism 210 to switch the output of voltage regulator 204 to either load 206-208, depending on the power consumption of loads 206-208. For example, control circuit 202 may use the load voltages of loads 206-208 as feedback voltages (e.g., "$V_{FB1}$" and "$V_{FB2}$") that are supplied as feedback signals for controlling switching mechanism 210. Control circuit 202 may further use the load voltages to generate a first control signal (e.g., "EN") to turn voltage regulator 204 on or off and a second control signal (e.g., "Ctrl") to control the output current of voltage regulator 204. In some instances, switching mechanism 210 may be configured to connect the output of voltage regulator 204 to both loads 206-208 at the same time in a "tied" configuration, as discussed in further detail below with respect to FIGS. 8A-8B.

Figure 2B:
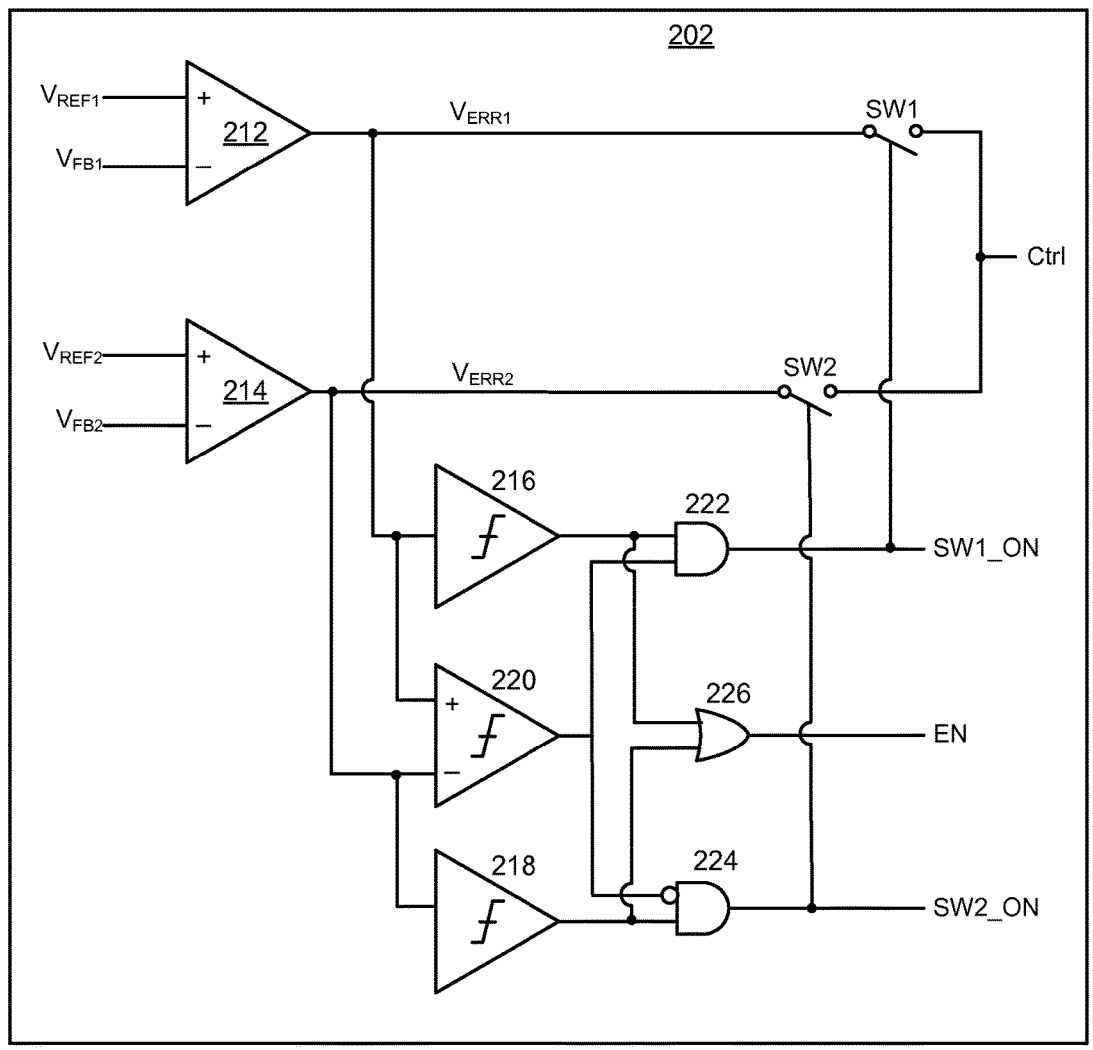
FIG. 2B shows an exemplary voltage-based control circuit in accordance with the disclosed embodiments.

As shown in FIG. 2B, an exemplary implementation of control circuit 202 that is compatible with the power-delivery system of FIG. 2A may include two error amplifiers 212-214 that generate two error signals such as error voltages (e.g., "$V_{ERR1}$" and "$V_{ERR2}$") from the feedback voltages of loads 206-208 and two reference voltages (e.g., "$V_{REF1}$" and "$V_{REF2}$"), respectively. Each reference voltage may represent a target value for the feedback voltage of the corresponding load 206-208. In turn, each error signal may represent the difference between the reference voltage and the load voltage of the load. For example, the error signal may be calculated by subtracting the feedback voltage of the load from the reference voltage for the load. As a result, the error signal may be negative when the load voltage is higher than the reference voltage and positive when the load voltage is lower than the reference voltage. Alternatively, error signals may be generated from reference and/or load currents instead of voltages.

Moreover, the gains of error amplifiers 212-214 may be selected to be different to increase the sensitivity to error of one load over that of the other load. For example, error amplifier 212 may have a higher gain than error amplifier 214 to prioritize driving of the load associated with the error signal from error amplifier 212 (i.e., load 206) over driving of the load associated with the error signal from error amplifier 214 (i.e., load 208).

The error signals from error amplifiers 212-214 may be provided to three comparators 216-220 in control circuit 202. Comparator 220 may determine which error signal is larger, comparator 216 may determine if the error signal from error amplifier 212 is positive, and comparator 218 may determine if the error signal from error amplifier 214 is positive. A positive value for a given error signal may indicate that the load voltage of the corresponding load is lower than its reference voltage. The outputs of comparators 216-220 are then provided as inputs to two AND gates 222-224 and/or an OR gate 226.

OR gate 226 is coupled to the outputs of comparators 216-218 and generates the control signal (e.g., "EN") for turning voltage regulator 204 on if either error signal is positive. If both error signals are negative (e.g., if each load has a higher load voltage than the corresponding reference voltage), OR gate 226 may use the control signal to turn voltage regulator 204 off.

AND gates 222-224 are coupled to the output of comparator 220, AND gate 222 is coupled to the output of comparator 216, and AND gate 224 is coupled to the output comparator 218. AND gates 222-224 may use the outputs of comparators 216-220 to generate switch control signals (e.g., "SW1_ON," "SW2_ON") for operating switches (e.g., "SW1," "SW2") coupled to the outputs of error amplifiers 212-214, respectively. In turn, the switches may couple one of the error signals to the control signal (e.g., "Ctrl") for controlling the output current of voltage regulator 204. In other words, AND gates 222-224 may provide an analog multiplexer that selects one of the two error signals to pass to voltage regulator 204 for controlling the output of voltage regulator 204. The switch control signals may also be used to control switching mechanism 210. For example, the "SW1_ON" signal may be used as the "SW" signal in FIG. 2A that controls switching mechanism 210 so that switching mechanism 210 couples voltage regulator 204 to load 206 when switch SW1 is closed and to load 208 when switch SW1 is open. Conversely, the switch control signals for the "SW1" and "SW2" switches in control circuit 202 may be generated separately from the "SW" signal for controlling switching mechanism 210.

Figure 2C:
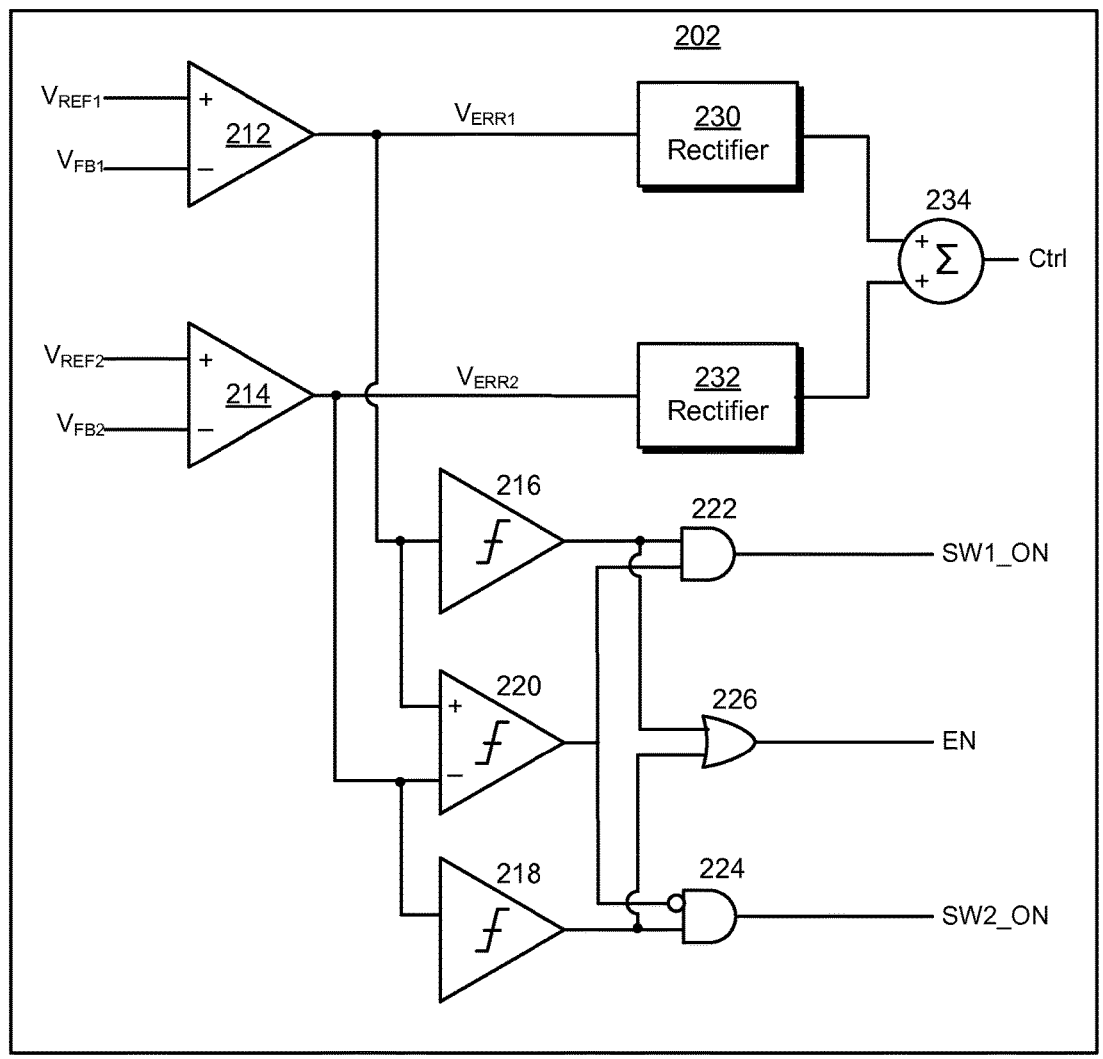
FIG. 2C shows an exemplary voltage-based control circuit in accordance with the disclosed embodiments.

Another control scheme for generating the control signal (e.g., "Ctrl") is shown in FIG. 2C. In FIG. 2C, the control signal may be generated as the sum of two half-wave-rectified error voltages from two rectifiers 230-232. That is, rectifiers 230-232 may rectify the error voltages from error amplifiers 212-214, respectively, by outputting the positive portions of the error voltages and setting the negative portions to 0. A positive error voltage may indicate a feedback voltage that is lower than the corresponding reference voltage, while a negative error voltage that is negative may represent a feedback voltage that is higher than the corresponding reference voltage. Thus, the positive error voltage may be reduced by supplying power from voltage regulator 204 to the corresponding load, while the negative error voltage may be reduced by reducing or removing the supply of power from voltage regulator 204 to the corresponding load. The rectified error voltages may then be summed by a voltage-summation circuit 234 as the control signal.

The control signal (e.g., "Ctrl") may be used to control the pulse-width modulation (PWM) of a switching waveform for controlling a switching voltage regulator 204 and/or as a peak current control for peak current-mode control of voltage regulator 204. For example, the control signal may provide the largest value of the half-wave-rectified error voltages (e.g., the error voltage with a positive value) to voltage regulator 204 so that voltage regulator 204 generates an output current that is proportional to the largest error signal.

Figure 2D:
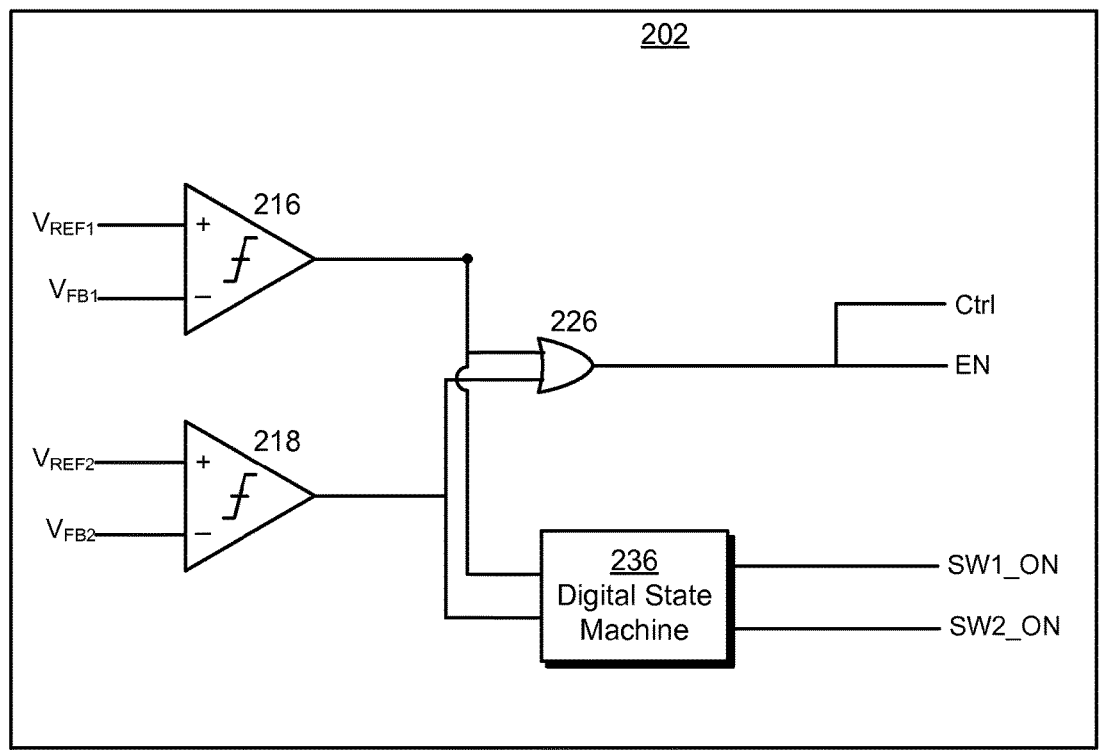
FIG. 2D shows an exemplary voltage-based control circuit in accordance with the disclosed embodiments.

To reduce the operating power of the regulator, the control circuit 202 may be implemented without error amplifiers, as shown in FIG. 2D. Comparators 216 and 218 may compare the feedback signals (e.g., "$V_{FB1}$" and "$V_{FB2}$") representing the load voltages of loads 206-208 with the corresponding reference voltages (e.g., "$V_{REF1}$" and "$V_{REF2}$") to generate request signals corresponding to error signals. The outputs of comparators 216-218 (e.g., the request signals) are provided to OR gate 226 to generate a logical disjunction signal that acts as control signals (e.g., "Ctrl" and "EN") for enabling voltage regulator 204 and controlling the output current of voltage regulator 204. Voltage regulator 204 may use the continuous-on duration of the logical disjunction signal to control the PWM, the peak current, and/or the current slope of voltage regulator 204.

Figure 2E:
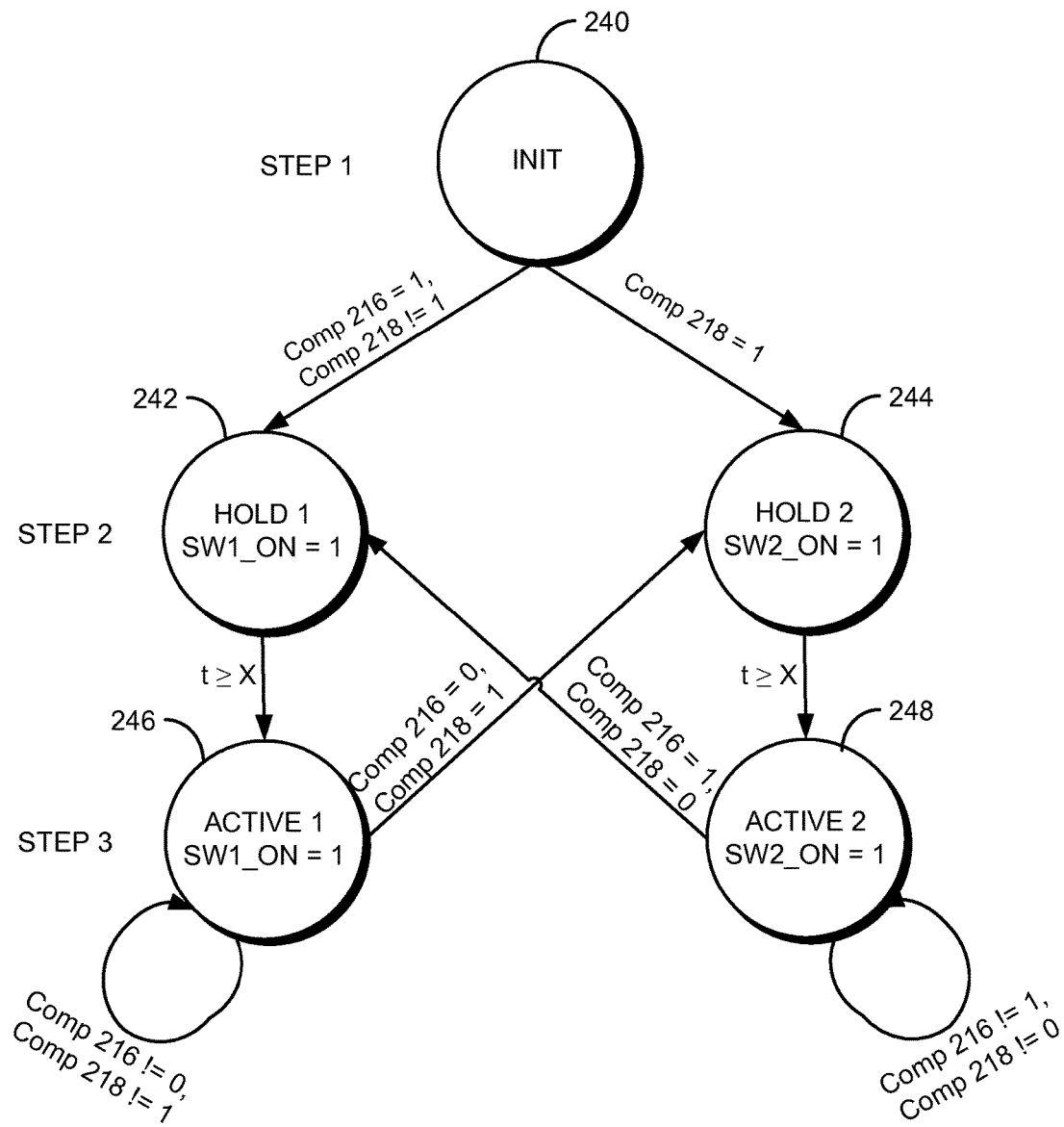
FIG. 2E shows a state diagram for a finite state machine in a control circuit in accordance with the disclosed embodiments.

The switching control for switching mechanism 210 may additionally be implemented as a first-come, first-served switching control using a finite state machine 236 in control circuit 202. The operation of finite state machine 236 is shown in FIG. 2E. Finite state machine 236 may include a first step (e.g., "STEP 1"), in which finite state machine 236 is in an initialization state 240 (e.g., "INIT"), and switching mechanism 210 couples the output of voltage regulator 204 to either of the loads 206-208.

Finite state machine 236 may also include a second step (e.g., "STEP 2") that allows a first of comparators 216-218 to assert a positive output (e.g., indicating that the load voltage of the corresponding load is lower than the reference voltage for the load) to cause switching mechanism 210 to couple to the corresponding load 206-208 for a minimum pre-specified time X (e.g., a number of microseconds). If comparator 216 asserts first without comparator 218 simultaneously asserting (e.g., "Comp 216=1, Comp 218 !=1"), finite state machine 236 may enter state 242 (e.g., "HOLD 1"), which generates a control signal (e.g., "SW1_ON=1") that causes switching mechanism 210 to couple the output of voltage regulator 204 to load 206. If comparator 218 asserts first (e.g., "Comp 218=1") with or without comparator 216 simultaneously asserting, finite state machine 236 may enter state 244 (e.g., "HOLD 2"), which generates a control signal (e.g., "SW2_ON=1") that causes switching mechanism 210 to couple the output of voltage regulator 204 to load 208. As a result, finite state machine 236 may enter state 242 only when comparator 216 asserts first and state 244 both when comparator 218 asserts first and both comparators 216-218 assert at the same time. During the time interval X, no switching is allowed and comparator 206-208 signals are ignored.

Finite state machine 236 may include a third step (e.g., "STEP 3") that occurs after the time interval X has elapsed. In the third step, switching mechanism 210 may remain in the same configuration until the corresponding comparator 216-218 is de-asserted and the other comparator is asserted. To this end, finite state machine 236 may enter a state 246-248 (e.g., "ACTIVE 1" or "ACTIVE 2") that maintains the configuration of switching mechanism 210. That is, finite state machine 236 may remain in state 246 while comparator 216 is asserted and comparator 218 is de-asserted (e.g., "Comp 216 !=0, Comp 218 !=1). Similarly, finite state machine 236 may remain in state 238 while comparator 218 is asserted and comparator 216 is de-asserted (e.g., "Comp 216 !=1, Comp 218 !=0). If the comparator associated with the state (e.g., state 246 or 248) de-asserts and the other comparator has a positive output, finite state machine 236 may go back to the second step and enter a state (e.g., state 242 or 244) that configures switching mechanism 210 to couple the output of voltage regulator 204 to the other load. For example, finite state machine 236 may remain in state 248 while comparator 218 is asserted and comparator 216 is de-asserted. When comparator 216 asserts and comparator 218 de-asserts, finite state machine 236 may transition to state 242. If both comparators are de-asserted, both finite state machine 236 and switching mechanism 210 may remain the same state and/or configuration until one comparator 216-218 has a positive output and triggers a switch back to a state in the second step.

The error signals may further be used by control circuit 202 to couple loads 206-208 to voltage regulator 204. In particular, control circuit 202 may use switching mechanism 210 to couple the load with the largest error signal to the output of voltage regulator 204, thereby allowing the load to be driven by the output. As the coupled load is driven by the output according to the error signal for the coupled load, the load voltage of the other load may fall until the other load has a larger error signal than the coupled load. Control circuit 202 may then use switching mechanism 210 to couple the other load to the output of voltage regulator 204 and provide the error signal of the other load to voltage regulator 204 so that voltage regulator 204 generates an appropriate output current for driving the other load.

Consequently, implementations of control circuit 202 in FIGS. 2B-2D may continuously switch between driving loads 206-208 using voltage regulator 204 and switching mechanism 210. As one load "charges" up using the output of voltage regulator 204, the load voltage of the other load drops until the error signal of the other load is larger, causing control circuit 202 to switch to charging the other load with the output of voltage regulator 204. Control circuit 202 may thus use feedback loops, switching mechanism 210, and a single voltage regulator 204 to regulate the load voltages of loads 206-208 to be at the corresponding reference voltages for loads 206-208.

Figure 3A:
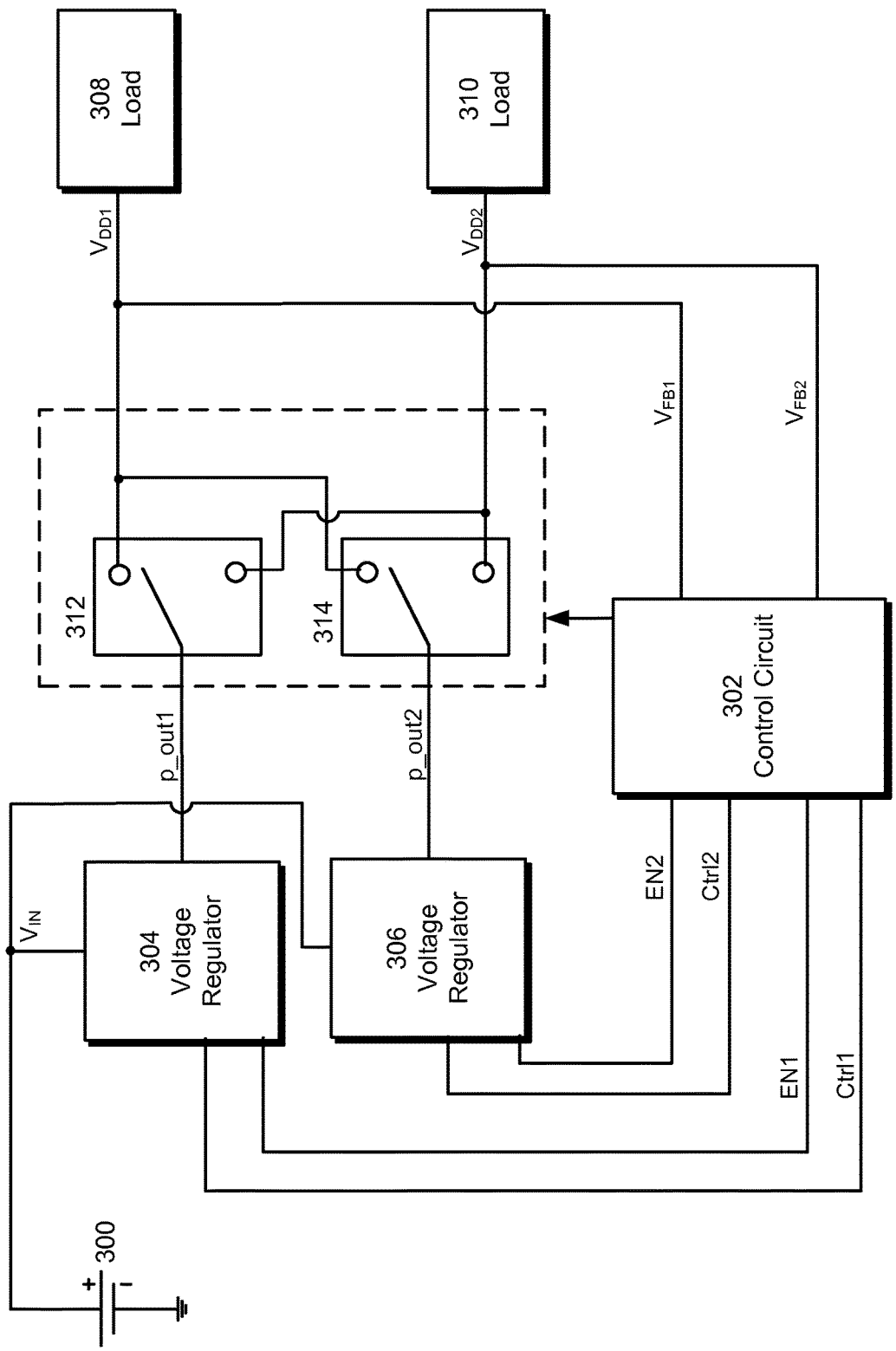
FIG. 3A shows a system for supplying power to components of a portable electronic device in accordance with the disclosed embodiments.

Such power-delivery techniques may also be applied to multiple-input, multiple-output (MIMO) systems. As shown in FIG. 3A, an input voltage (e.g., "$V_{IN}$") is supplied from a power source 300 and converted into two load voltages (e.g., "$V_{DD1}$" and "$V_{DD2}$") for driving two loads 308-310 using a control circuit 302, two voltage regulators 304-306, and two switching mechanisms 312-314. The power supply of FIG. 3A may thus be a 2-in 2-out MIMO system.

In particular, the inputs of voltage regulators 304-306 are coupled to the input voltage, and loads 308-310 are selectively coupled to an output (e.g., "p_out1") of voltage regulator 304 using switching mechanism 312 and an output (e.g., "p_out2") of voltage regulator 306 using switching mechanism 314. At any given moment, voltage regulators 304-306 may be connected to the same load or to different loads. Although the power-delivery system of FIG. 3A is illustrated with voltage regulators 304-306, those skilled in the art will appreciate that the power-delivery system may utilize any suitable power converters, such as the power converters discussed above.

As with control circuit 202 of FIGS. 2A-2B, control circuit 302 may use switching mechanisms 312-314 to switch the outputs of voltage regulators 304-306 to either load 308-310, depending on the power consumption of loads 308-310. For example, control circuit 302 may use the load voltages of loads 308-310 as feedback voltages (e.g., "$V_{FB1}$" and "$V_{FB2}$") for: controlling switching mechanisms 312-314, generating a first set of control signals (e.g., "EN1," "EN2") for turning voltage regulators 304-306 on or off, and generating a second set of control signals (e.g., "Ctrl1," "Ctrl2") for controlling the output currents of voltage regulators 304-306. Each control signal may be used to control the operation and/or output of the corresponding voltage regulator. For example, "EN1" may be used to turn voltage regulator 304 on and off, "Ctrl1" may be used to control the output current of voltage regulator 304, "EN2" may be used to turn voltage regulator 306 on and off, and "Ctrl2" may be used to control the output current of voltage regulator 306.

In one or more embodiments, voltage regulators 304-306 include a higher-efficiency, lower-power regulator and a higher-power, lower-efficiency regulator. To facilitate efficient operation of the power supply, the higher-efficiency regulator may be used as a primary voltage regulator for driving loads 308-310, and the higher-power regulator may be turned on only when more power than the higher-efficiency regulator can deliver is required by one or both loads 308-310.

Figure 3B:
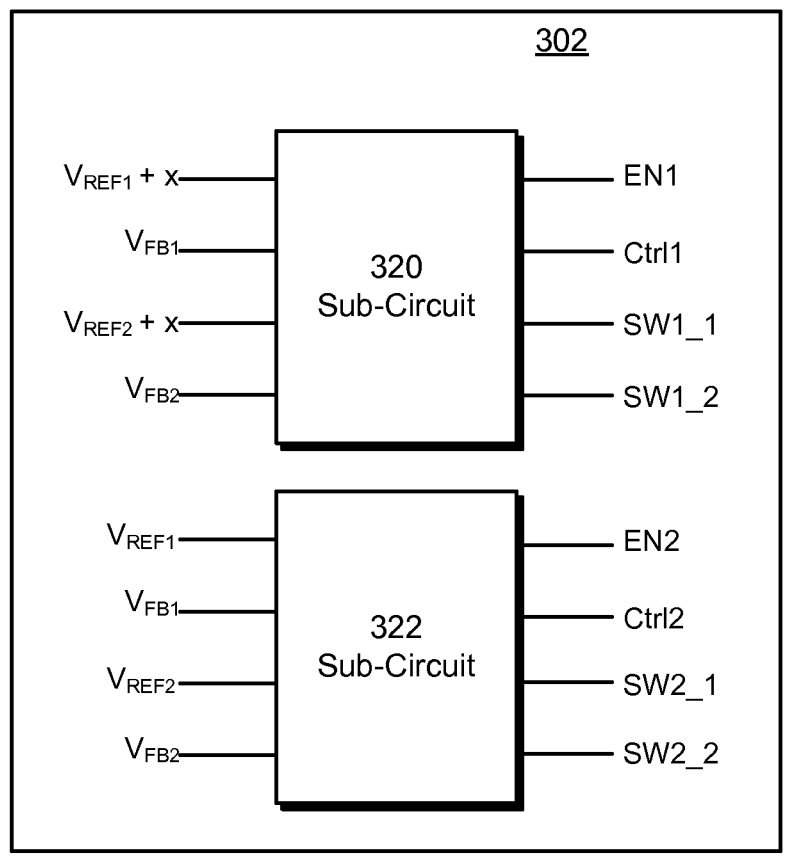
FIG. 3B shows a control circuit in accordance with the disclosed embodiments.

As shown in FIG. 3B, one example of control circuit 302 suitable for use in the system of FIG. 3A includes two sub-circuits 320-322, with each sub-circuit used to independently control a different voltage regulator 304-306 and switching mechanism 312-314 coupled to the voltage regulator. Each sub-circuit 320-322 may include the components of various examples of control circuit 202 in FIGS. 2A-2D. Each sub-circuit may generate error signals based on a comparison of feedback voltages and corresponding reference voltages (e.g., using error amplifiers as discussed with respect to FIGS. 2B-2D). For example, sub-circuits 320-322 may each include two error amplifiers that generate error signals (e.g., error voltages) for loads 308-310 from the load and/or feedback voltages of loads 308-310 (e.g., "$V_{FB1}$" and "$V_{FB2}$") and reference voltages (e.g., "$V_{REF1}$," "$V_{REF2}$," "$V_{REF1}$+x," "$V_{REF2}$+x") for driving the loads using each voltage regulator 304-306. Each sub-circuit 320-322 may also include three comparators that identify the larger error signal from loads 308-310 and indicate whether the load voltages of loads 308-310 are lower than their reference voltages. Finally, each sub-circuit 320-322 may include an OR gate that generates a control signal (e.g., "EN1," "EN2") for turning the corresponding voltage regulator 304-306 on and off, as well as two AND gates that generate switch control signals (e.g., "SW1_1," "SW1_2," "SW2_1," "SW2_2") for operating switches that couple the larger error signal to a control signal (e.g., "Ctrl1," "Ctrl2") for controlling the output current of the voltage regulator.

Each of sub-circuits 320-322 may additionally use the error signals and switching mechanisms 312-314 to couple the load with the largest error signal to the voltage regulators corresponding to the sub-circuit. Consequently, sub-circuits 320-322 may each be a SIMO control circuit that is included in control circuit 302 to enable control of a MIMO power-delivery system.

In addition, the reference voltages used with sub-circuit 320 (e.g., "$V_{REF1}$+x," "$V_{REF2}$+x") may be higher than the reference voltages used with sub-circuit 322 (e.g., "$V_{REF1}$," "$V_{REF2}$"). For example, the reference voltages used with sub-circuit 320 may be a predetermined amount (e.g. 10 mV) higher than the reference voltages used with sub-circuit 322. By setting higher reference voltages for use by sub-circuit 320, control circuit 302 may increase the use of the voltage regulator (e.g., a higher-efficiency, lower-power regulator) controlled by sub-circuit 320 over the use of the voltage regulator (e.g., a higher-power, lower-efficiency regulator) controlled by sub-circuit 322 in driving loads 308-310.

More specifically, the higher reference voltages used by sub-circuit 322 may allow a higher-efficiency voltage regulator controlled by sub-circuit 320 to be used in driving loads 308-310 by outputting voltages to loads 308-310 that are regulated to be at the higher reference voltages. Since the higher reference voltages are above the reference voltages of sub-circuit 322, sub-circuit 322 may generate a control signal (e.g., "EN2") that turns off a higher-power voltage regulator controlled by sub-circuit 322. However, when one or both loads 308-310 draw power at a level above the power limit of the higher-efficiency voltage regulator controlled by sub-circuit 320, the power demands of the load(s) may exceed the power limit of the higher-efficiency voltage converter, causing the load voltage(s) of the load(s) to decrease. Once the load voltage(s) decrease to at or below the reference voltage(s) of sub-circuit 322, sub-circuit 322 may engage (e.g., turn on) the higher-power voltage regulator and use an output voltage from the output of the higher-power voltage regulator to supplement the lowered load voltage(s). When the higher-power voltage regulator is not used to supplement the load voltage(s), the higher-power voltage regulator may be placed in a power savings standby mode.

The efficiency and/or transient response of the power-delivery system may further be improved by using different maximum switching frequencies to drive loads 308-310. For example, sub-circuit 320 may use a first maximum switching frequency (e.g., 400 KHz) to couple the load with the largest error signal to the output of the higher-efficiency regulator, while sub-circuit 322 may use a second maximum switching frequency that is higher than the first switching frequency (e.g., 2 MHz) to couple the load with the largest error signal to the output of the higher-power regulator. The maximum switching frequency of each sub-circuit may be limited using a clock signal and/or a minimum dwell time (e.g., time interval X in finite state machine 236 of FIGS. 2D-2E). The lower maximum switching frequency of sub-circuit 320 may improve the efficiency of the higher-efficiency regulator, while the higher maximum switching frequency of sub-circuit 322 may improve the transient response of the higher-power regulator. Alternatively, the operation of sub-circuits 320-322, components within sub-circuits 320-322, and/or switching mechanisms 312-314 may be asynchronous.

Figure 4A:
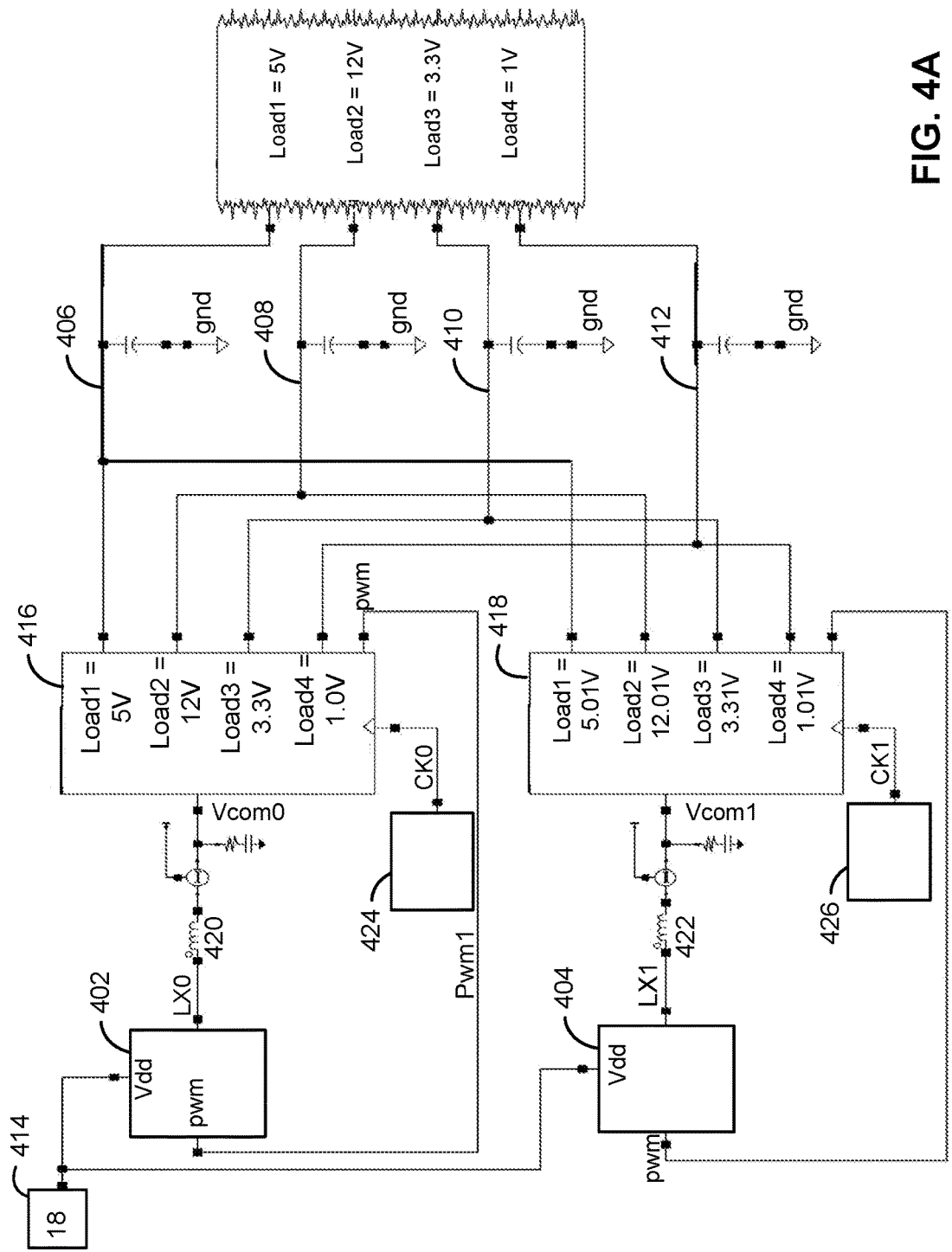
FIG. 4A shows an exemplary power-delivery system in accordance with the disclosed embodiments.
Figure 4B:
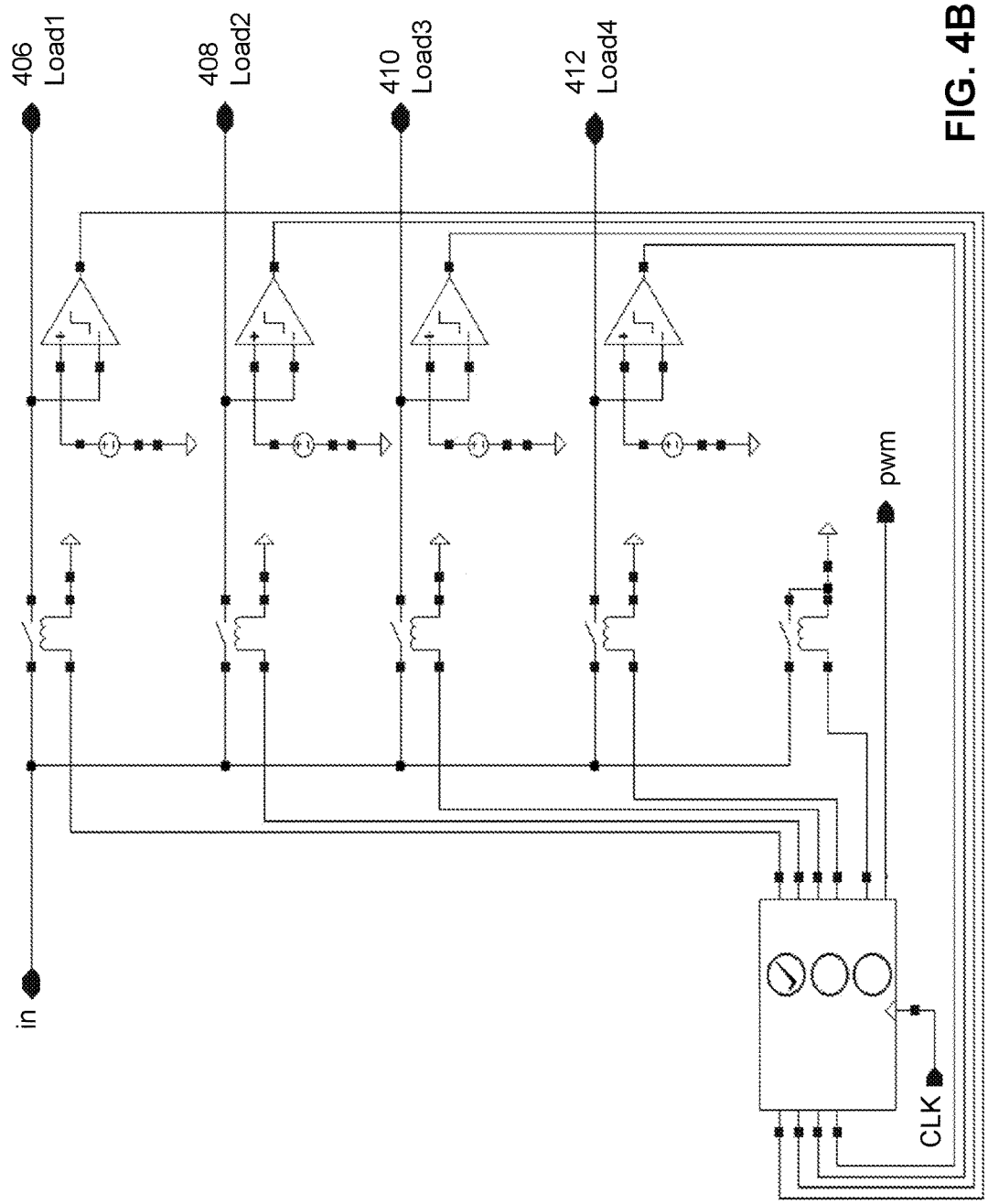
FIG. 4B shows an exemplary control circuit in accordance with the disclosed embodiments.

FIG. 4A shows an exemplary power-delivery system in accordance with the disclosed embodiments. More specifically, FIG. 4A shows a 2-in 4-out MIMO power-delivery system with a set of simulation settings. Similarly, FIG. 4B shows a control circuit for the simulated MIMO power-delivery system of FIG. 4A.

The MIMO power-delivery system of FIG. 4A includes two buck converters 402-404 and load voltages 406-412 of four different loads (e.g., "Load1," "Load2," "Load3," "Load4"). One buck converter 404 is a high-efficiency converter for regulating power (e.g., maintaining load voltages) during normal and/or light-load conditions, and the other buck converter 402 is a high-power converter for driving high loads and/or transient conditions. An input voltage is supplied to buck converters 402-404 from a power source 414 such as a battery pack.

Converter 402 may be coupled to the loads using a switching mechanism 416, and converter 404 may be coupled to the loads using a separate switching mechanism 418. Reference voltages for driving the "Load1," "Load2," "Load3," and "Load4" loads using the high-power converter 402 may be set to 5V, 12V, 3.3V, and 1V, respectively, in switching mechanism 416. Reference voltages for driving the "Load1," "Load2," "Load3," and "Load4" loads using the high-efficiency converter 404 may be set to slightly higher values of 5.01V, 12.01V, 3.31V, and 1.01V, respectively, in switching mechanism 418. Both buck converters 402-404 may be controlled using constant on-time peak current control. The high-efficiency converter 404 may have an inductor 422 with an inductance of 2.2 uH, a peak output current of 1 A, and a switching speed of 400 KHz provided by a clock 426. The high-power converter 402 may have an inductor 420 with an inductance of 200 nH, a peak output current of 10 A, and a switching speed of 2 MHz provided by a separate clock 424. The reference voltage used with the high-efficiency converter 404 may be 10 mV higher than the reference voltage used with the high-power converter 402.

Figure 5B:
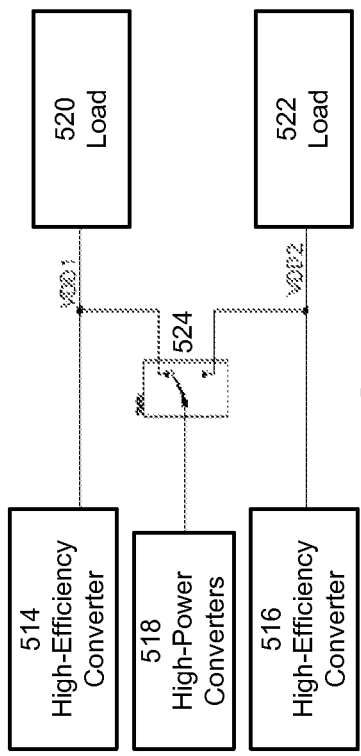
FIG. 5B shows a power-delivery system in accordance with the disclosed embodiments.
Figure 5D:
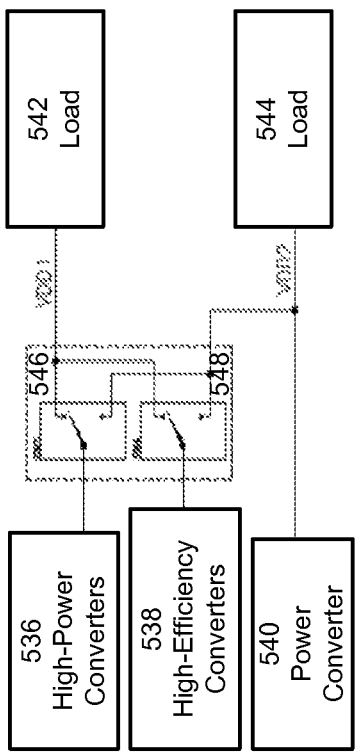
FIG. 5D shows a power-delivery system in accordance with the disclosed embodiments.
Figure 5A:
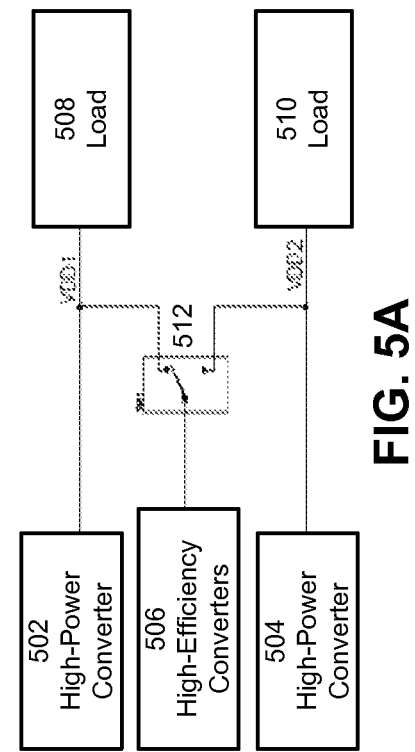
FIG. 5A shows a power-delivery system in accordance with the disclosed embodiments.

Alternative configurations of inputs and outputs in the power-delivery system are shown in FIGS. 5A-5D. In particular, FIG. 5A shows three power converters coupled to two loads 508-510. One or more high-efficiency converters 506 may be selectively coupled to one or both loads 508-510 using a switching assembly 512, and a dedicated high-power converter 502-504 is coupled to each load 508-510.

The shared high-efficiency converters 506 may be switched or shared between the two loads 508-510 based on the power demands of loads 508-510. For example, switching assembly 512 may couple a single high-efficiency converter to the load from loads 508-510 with the highest need, which may be represented by the difference between the reference voltage for driving the load using high-efficiency converter 506 and a load voltage of the load. If the power-delivery system includes multiple high-efficiency converters 506, switching assembly 512 may divide high-efficiency converters 506 between loads 508-510 depending on need by, for example, allocating more converters to the load with the higher demand. High-power converters 502-504 may also be associated with a higher activation threshold than high-efficiency converters 506 to facilitate efficient operation of the power supply. For example, the reference voltages of high-efficiency converters 506 may be slightly higher than the reference voltages of high-power converters 502-504 to enable use of high-efficiency converters 506 during normal, light-load conditions. Each high-power converter 502-504 may then be engaged and used to supplement the output of high-efficiency converter 506 once the power demands of the corresponding load cause the load voltage of the load to drop below the reference voltage of the high-power converter.

FIG. 5B also shows three power converters coupled to two loads 520-522. In the configuration of FIG. 5B, a dedicated high-efficiency converter 514-516 is coupled to each load 520-522, and one or more high-power converters 518 are shared by loads 520-522 using a switching assembly 524. As with switching assembly 512 of FIG. 5A, switching assembly 524 may divide multiple high-power converters 518 between loads 520-522 depending on need, or switching assembly 524 may allocate a single high-power converter to the load with the higher demand. High-power converter 518 may be used to drive one or both loads 520-522 only when the power demands of the load(s) exceed the power limits of the corresponding dedicated high-efficiency converter(s) and cause the load voltage(s) of the load(s) to drop below the reference voltage of high-power converter 518.

Figure 5C:
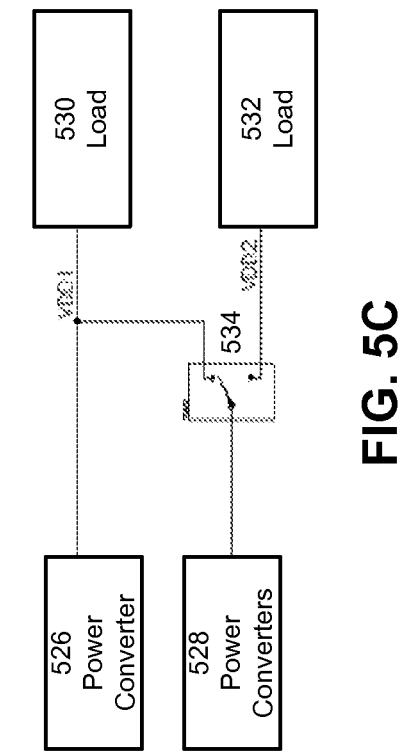
FIG. 5C shows a power-delivery system in accordance with the disclosed embodiments.

FIG. 5C shows a number of power converters 526-528 and two loads 530-532. One power converter 526 is a dedicated power converter that is directly coupled to a first load 530, while one or more additional power converter 528 are shared between the first load and a second load 532 using a switching assembly 534 according to the needs of loads 530-532.

FIG. 5D shows a number of power converters and two loads 542-544. One or more high-power converters 536 and one or more high-efficiency converters 538 are shared by both loads using two switching assemblies 546-548, and a third dedicated power converter 540 is coupled directly to the second load 544.

Figure 6:
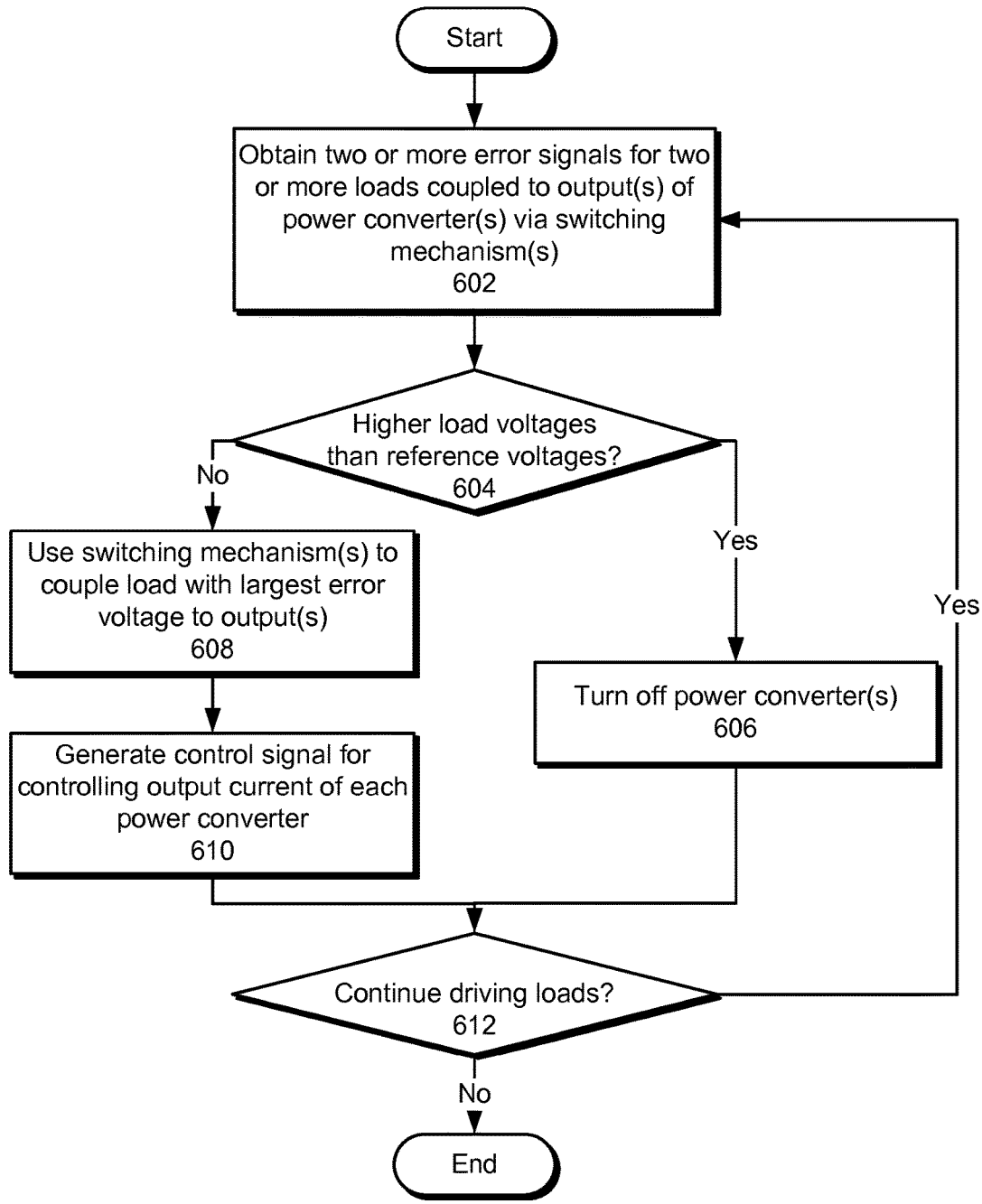
FIG. 6 shows a flowchart illustrating the process of operating a power supply in accordance with the disclosed embodiments.

FIG. 6 shows a flowchart illustrating the process of operating a power supply in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, two or more error signals for two or more loads coupled to the output(s) of one or more power converters via one or more switching mechanisms are obtained (operation 602). For example, the switching mechanisms may be disposed between the outputs of one or more voltage regulator and the loads. As a result, the voltage regulator(s) may be controlled in a group so that all voltage regulators in the group are coupled to a given load at the same time.

The error signals may be provided by two or more error amplifiers and/or comparators. Each error signal may be an error voltage that represents the difference between a reference voltage for driving a load from the two or more loads using a voltage regulator and a load voltage of the load. For example, the error signal may include an analog error voltage generated by an error amplifier and/or a digital request signal generated by a comparator. As a result, a reference voltage may be set for each load and each voltage regulator that may be used to drive the load. Each reference voltage may represent a constant target regulated output voltage of the corresponding load. The error signal may thus be positive if the load voltage is lower than the reference voltage and negative if the load voltage is higher than the reference voltage.

Next, the error signals may be used to determine if the load voltages are higher than the corresponding reference voltages (operation 604) for each power converter or group of power converters that are collectively coupled to one of the loads. If all load voltages are higher than their corresponding reference voltages, the power converter(s) that can be selectively coupled to the loads are turned off (operation 606). For example, a high-power voltage regulator may be turned off if the load voltages of the corresponding loads are regulated to be at the reference voltage(s) of a high-efficiency voltage regulator, which is higher than the reference voltage(s) of the high-power voltage regulator.

If one or more load voltages are lower than the corresponding reference voltages, one or more switching mechanism(s) may be used to couple the load with the largest error signal to one or more outputs of one or more power converters (operation 608). For example, an output of a voltage regulator may be coupled to the load associated with a comparator that first signals a request signal representing a lower load voltage for the load than the reference voltage for the load. Coupling of the output to the load may also be maintained for a minimum pre-specified time. Such coupling of the output to the load may continue until the comparator no longer asserts a lower load voltage for the reference voltage and another comparator associated with the voltage regulator signals a separate request signal representing a lower load voltage for the load associated with the comparator than the load's reference voltage.

Alternatively, no switching mechanism may be required to couple the load to an output of a power converter (e.g., a dedicated voltage regulator) if the load is connected directly to the output. In addition, a control signal for controlling an output current of each coupled power converter may be generated (operation 610). The control signal may be generated using the largest value of a half-wave-rectified error signal (e.g., the positive portion of the error signal) from the two or more error signals, the sum of positive error signals, and/or an on-duration of a logical disjunction signal generated from the error signals. In addition, the output current may be generated by each coupled power converter to be proportional to the corresponding control signal.

The loads may continue to be driven (operation 612) using the switching mechanism(s) and power converter(s). If the loads are to be driven, error signals for the loads are periodically and/or continuously obtained (operation 604) and used to operate the power converter(s) and/or couple the power converter(s) to the loads (operations 604-610). The operations in the flowchart of FIG. 6 may also be repeated for each group of commonly controlled power converters, such as groups of one or more power converters coupled to individual sub-circuits (e.g., sub-circuits 320-322 of FIG. 3B) of a control circuit (e.g., control circuit 302 of FIGS. 3A-3B) in the power supply. Voltages and currents may continue to be supplied to the loads by the power converter(s) until the power supply is no longer used to drive the loads.

Figure 7A:
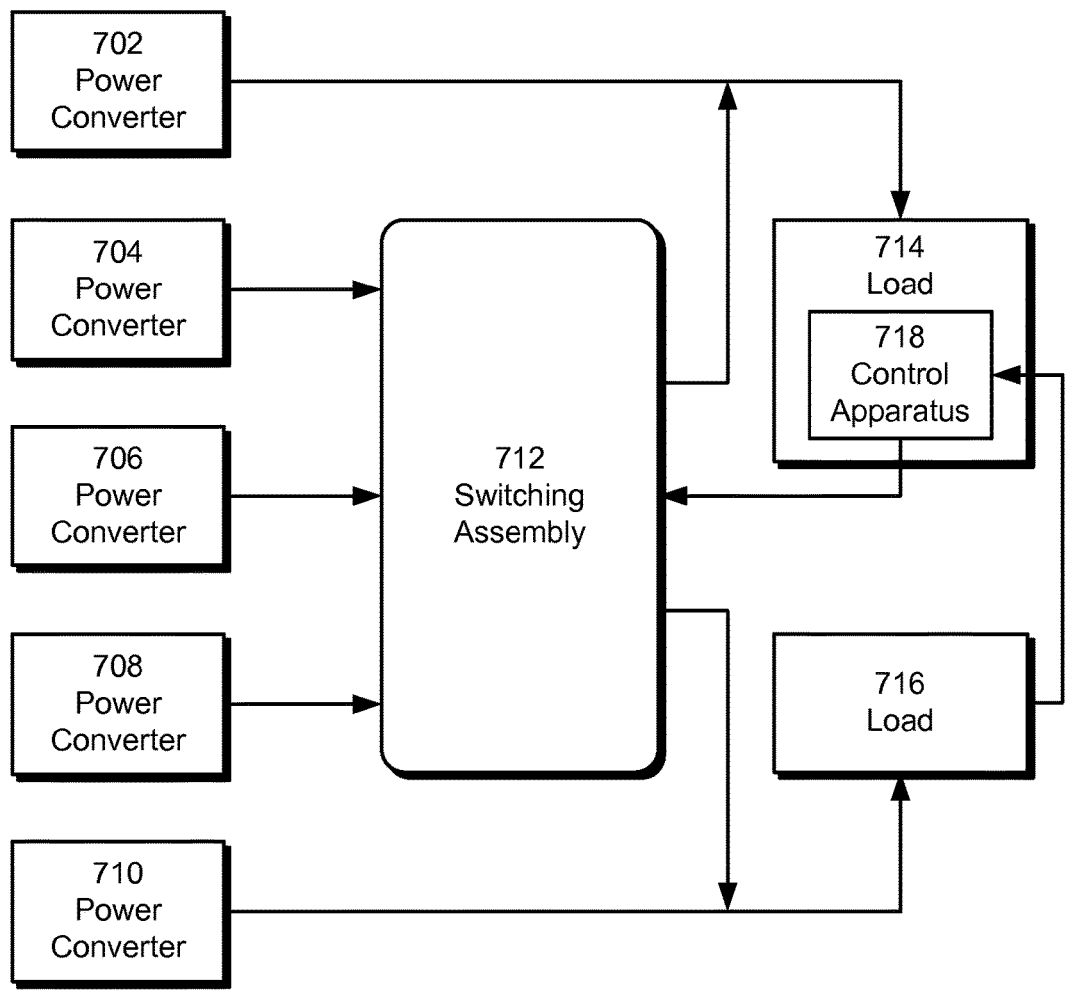
FIG. 7A shows a power-delivery system in accordance with the disclosed embodiments.

In one or more embodiments, a MIMO power-delivery system such as the power-delivery systems of FIGS. 3A, 4A, and 5A-5D may be configured through a software-based control apparatus. As shown in FIG. 7A, the outputs of a number of power converters 702-710 may be coupled to two or more loads 714-716 through a switching assembly 712 comprising one or more switching mechanisms. A control apparatus 718 (which may be executing within a load, e.g., load 714) may be used to generate control signals for switching assembly 712 so that power converters 702-710 are coupled to loads 714-716 through switching assembly 712 in various configurations. For example, control apparatus 718 may be a software component that executes within an operating system and/or system microcontroller (SMC) of a portable electronic device. The software component may monitor conditions in loads 714-716 and generate control signals for controlling an actively controlled switching assembly 712 that includes switching mechanisms such as power metal-oxide-semiconductor field-effect transistors (MOSFETs).

More specifically, the output of one or more power converters (e.g., power converter 702) may be coupled directly to load 714, and the output of one or more power converters (e.g., power converter 710) may be coupled directly to load 716. Power converters 704-708 may individually be coupled to either load 714-716 through switching assembly 712 that are controlled by control apparatus 718.

In some instances, control apparatus 718 may be used to configure the delivery of power from power converters 702-710 to loads 714-716 that are capable of drawing, in aggregate, power that exceeds the power-output capabilities of power converters 702-710. For example, power converters 702-710 may each be 3 W step-down buck regulators in a space-limited portable electronic device, while each load 714-716 in the portable electronic device may draw up to 10 W of power. Thus, the maximum power that can be drawn by both loads 714-716 is 20 W, which exceeds the maximum of 15 W that can be delivered by power converters 702-710.

In these instances, the total amount of power drawn by both loads 714-716 may be limited to the maximum that can be supplied by power converters 702-710. Continuing with the above example, loads 714-716 may be prevented from drawing the maximum 10 W of power at the same time because power converters 702-710 cannot supply 20 W of power to loads 714-716.

In one or more embodiments, control apparatus 718 may manage the delivery of power from power converters 702-710 to loads 714-716 based on discrete, pre-defined power states of loads 714-716. The power states may be represented by different power supply voltage and clock frequency combinations in the portable electronic device. For example, the power states of one or both loads 714-716 may be represented by monotonically increasing numbers from 0 to N with increasing power demands (e.g., power supply voltage VDD and clock frequency $F_{CLK}$). The power state represented by 0 may be the lowest power state, which is used during idle periods in the portable electronic device. The power state represented by N may be the highest power state, which is used to maximize computing power on the portable electronic device. Power states represented by 1 through N-1 may be selected based on the computing demands of applications and/or components on the portable electronic device.

Since the power demand of loads 714-716 may be directly related to the power states of loads 714-716, control apparatus 718 may dynamically configure the coupling of power converters 702-710 to loads 714-716 based on the power states. In general, control apparatus 718 may configure the coupling of at least one power converter and up to four power converters to each load 714-716, with more power converters assigned to the load with the higher power state. For example, an operating system on the portable electronic device may determine the power states of loads 714-716 and execute control apparatus 718 to generate control signals for configuring the power-delivery system based on the power states and/or a power-delivery policy for the portable electronic device.

Using the exemplary monotonically increasing power states of 0 through 9, control apparatus 718 may configure the coupling of loads 714-716 to power converters 702-710 through switching assembly 712 using the following exemplary power-delivery policy:

1. If the power state of a first load increases from less than 2 to 2 or 3 and the power state of the second load is lower than 6, the first load will be coupled to two power converters if the first load is currently coupled to only one power converter.
 2. If the power state of the first load increases from less than 4 to 4 or 5 and the power state of the second load is lower than 4, the first load will be coupled to three power converters if the first load is currently coupled to fewer than three power converters.
 3. If the power state of the first load increases from less than 6 to 6 or 7 and the power state of the second load is lower than 2, the first load will be coupled to four power converters if the first load is currently coupled to fewer than four power converters.

The power-delivery policy may thus specify an increase in the number of power converters coupled to a given load when the power state of the load increases above a first threshold and/or the power state of the other load remains below a second threshold. On the other hand, if an increase in the power state of the load does not exceed the first threshold, the power-delivery policy may maintain an existing configuration of the coupling of loads 714-716 to power converters 702-710 through switching assembly 712 to avert unnecessary power dissipation associated with reconfiguring switching assembly 712.

Those skilled in the art will appreciate that the exemplary power-delivery policy described above may be used to couple loads 714-716 to power converters 702-710 as long as the maximum power demand from both loads does not exceed the 15 W that can be supplied by all five power converters 702-710. If the power demanded by loads 714-716 exceeds the maximum that can be generated by power converters 702-710, one or both loads may experience voltage droops, current surges, and/or power overages.

Figure 7B:
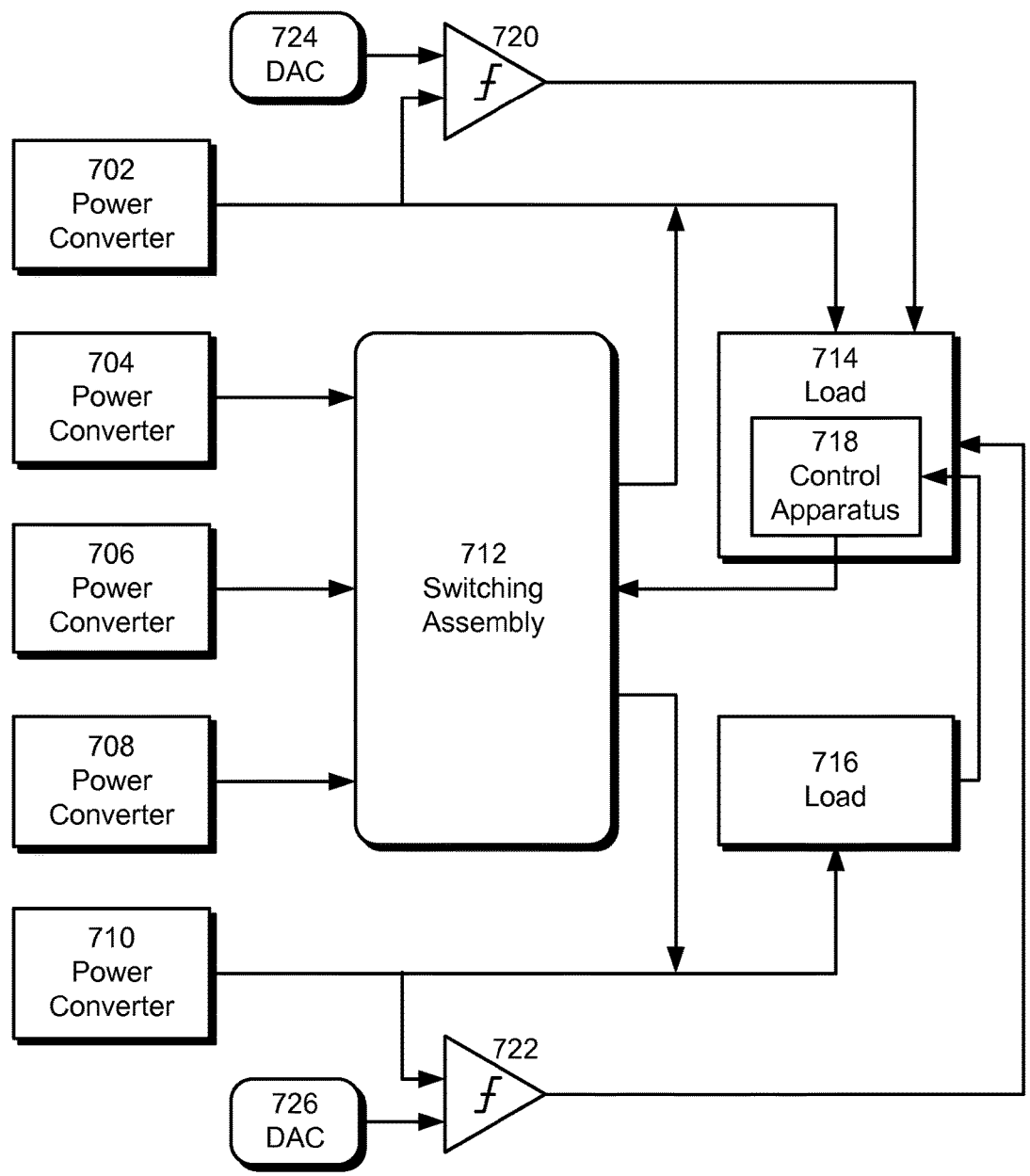
FIG. 7B shows a power-delivery system in accordance with the disclosed embodiments.

As shown in FIG. 7B, the desired power states and/or power demands of loads 714-716 may be monitored by a number of digital-to-analog converters (DACs) 724-726 and comparators 720-722 that are added to the power-delivery system of FIG. 7A. Comparator 720 may compare the load voltage of load 714 with a reference voltage for driving load 714 from DAC 724 to detect a droop in the load voltage of load 714. Similarly, comparator 722 may compare the load voltage of load 716 with a reference voltage for driving load 716 from DAC 726 to detect a droop in the load voltage of load 716.

Control apparatus 718 may monitor the voltage droops of loads 714-716 from comparators 720-722 and generate control signals for controlling switching assembly 712 and/or the power states of loads 714-716 based on the monitored voltage droopss, current surges, and/or power overages. If the load voltage of a first load is lower than the corresponding reference voltage by more than a given amount (e.g., 50 mV), control apparatus 718 may generate a control signal to change a coupling of one or more additional power converters from a second load to the first load. Control apparatus 718 may also reduce a power state of the first load, in lieu of or in addition to diverting the additional power converters from the second load to the first load.

For example, control apparatus 718 may divert power converters from the second load to the first load if a voltage droop on the first load is detected and the first load has a higher priority than the second load. If the second load subsequently experiences voltage droop, control apparatus 718 may reduce the power state of the second load until the voltage droop on the second load is no longer detected.

In another example, both loads 714-716 may experience voltage droop if the power states of loads 714-716 are higher than can be accommodated by the subsets of power converters 702-710 coupled to loads 714-716. To manage such voltage droops, current surges, and/or power overages, control apparatus 718 may reduce the power states of both loads 714-716 until the voltage droop is no longer detected on both loads 714-716. Alternatively, control apparatus 718 may prioritize the driving of a first load over a second load by increasing the number of power converters coupled to the first load and reducing the power state of the second load until the voltage droop is no longer detected on both loads 714-716. Such prioritization may occur when the power demands of one load must be met to satisfy certain system needs, such as powering of critical system components in the load. Finally, control apparatus 718 may reduce the power states of both loads 714-716 while diverting one or more power converters from one load to another until the voltage droop is no longer detected on both loads 714-716.

Figure 8A:
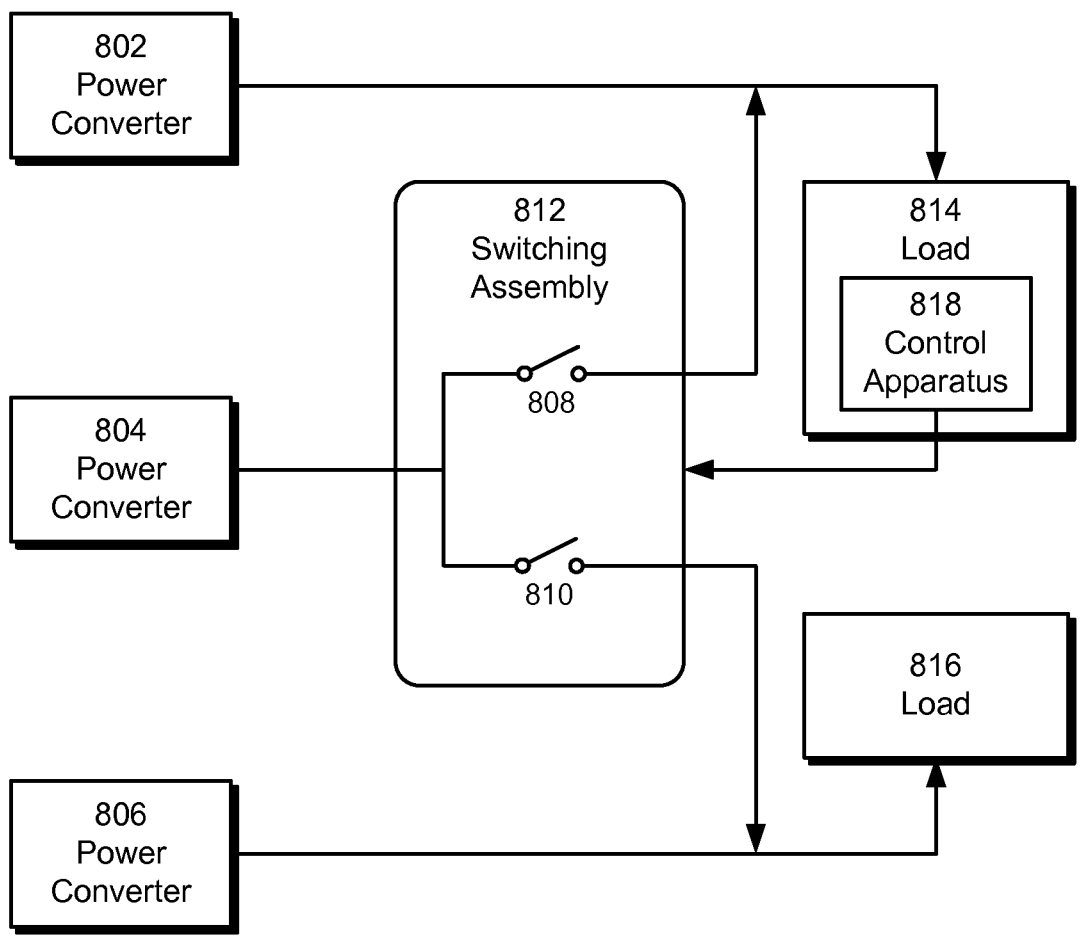
FIG. 8A shows a power-delivery system in accordance with the disclosed embodiments.

The MIMO power-delivery systems described above may further be configured to operate in a "tied" configuration that combines multiple power converters into a single output that is used to power multiple loads in a portable electronic device. As shown in FIG. 8A, the outputs of a number of power converters 802-806 may be coupled to two or more loads 814-816 through a switching assembly 812. A software and/or hardware control apparatus 818 executing within load 814 may be used to generate control signals for switching assembly 812 to configure the coupling of power converters 802-806 to loads 814-816 through switching assembly 812.

In particular, the output of power converter 802 may be coupled directly to load 814, and the output of power converter 806 may be coupled directly to load 816. Switching assembly 812 may include two switches 808-810 that collectively couple the output of power converter 804 to one or both loads 814-816. For example, switch 808 may be closed to couple power converter 804 to load 814, switch 810 may be closed to couple power converter 804 to load 816, and both switches 808-810 may be closed to couple all power converters 802-806 to both loads 814-816.

Figure 8B:
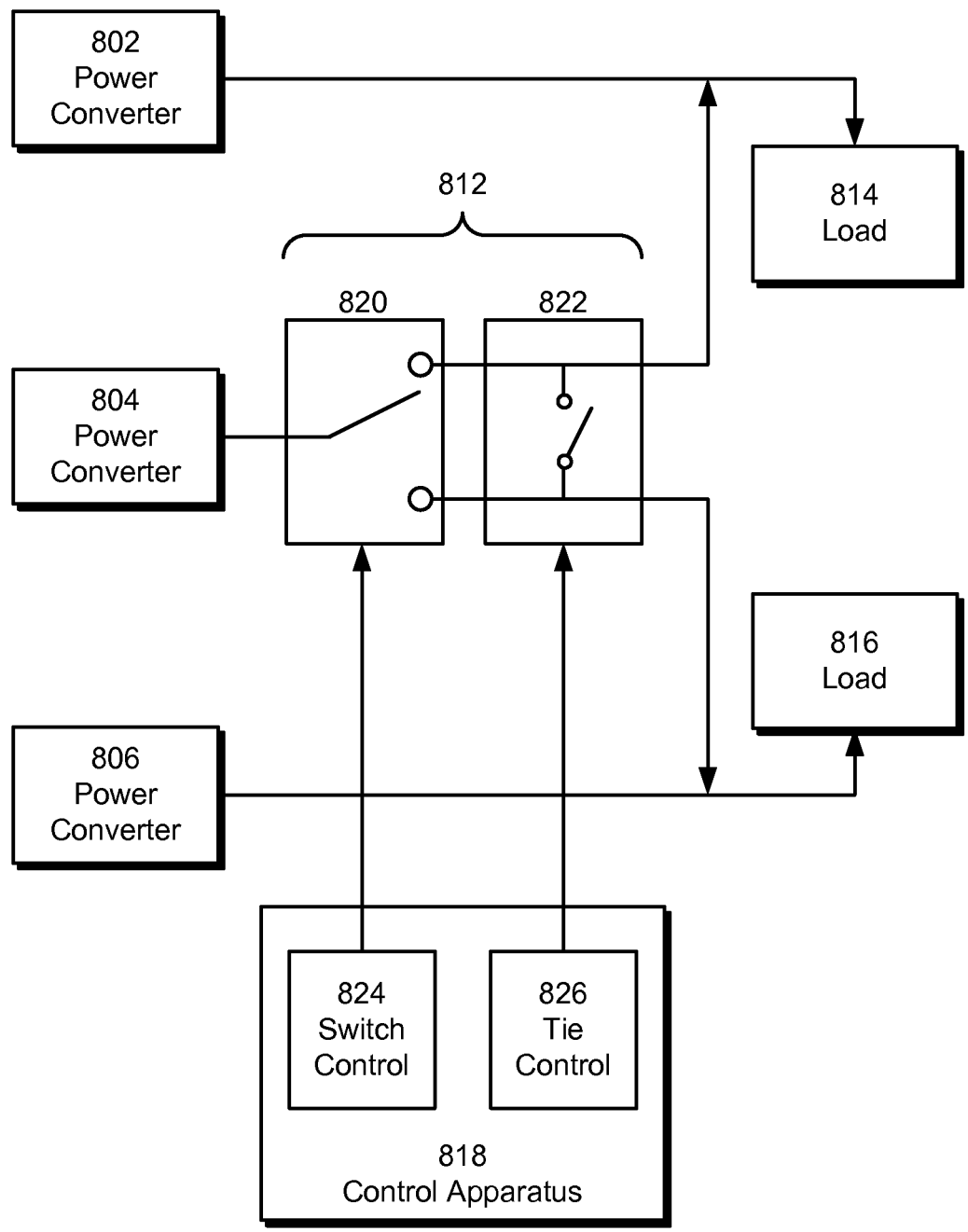
FIG. 8B shows a power-delivery system in accordance with the disclosed embodiments.

An alternative implementation of the "tied" configuration may be provided by the MIMO power-delivery system of FIG. 8B. As with the power-delivery system of FIG. 8A, the power-delivery system of FIG. 8B includes three power converters 802-806 that can be coupled to two loads 814-816. The output of power converter 802 may be coupled directly to load 814, and the output of power converter 806 may be coupled directly to load 816. Switching assembly 812 include a first switch 820 that couples the output of power converter 804 to either load 814-816, as well as a second switch 822 that can be closed to "tie" the output of all power converters 802-806 to both loads 814-816, independently of the state of switch 820. Control apparatus 818 includes a switch control 824 that generates a control signal for switch 820 and a tie control 826 that generates a control signal for switch 822.

During power-state-based control of the power-delivery system, control apparatus 818 may monitor the power demand of each load 814-816 to determine the configuration of the power-delivery system. When the power state of each load 814-816 is below a pre-specified threshold, control apparatus 818 may configure switching assembly 812 to power loads 814-816 separately. When the power state of either load exceeds the corresponding threshold, control apparatus 818 may operate the power-delivery system in the "tied" configuration so that the outputs of all power converters 802-806 are tied to the inputs of both loads 814-816. The "tied" configuration may increase the peak current supplied to multiple loads when one of the loads demands higher current than can be supplied by the corresponding dedicated power converter(s).

For example, load 814 may be associated with a first numeric threshold M, and load 816 may be associated with a second numeric threshold N, which may be the same or different from M. When the power states of loads 814-816 are lower than M and N, respectively, control apparatus 818 may generate control signals for switching assembly 812 so that each load 814-816 is powered separately by the corresponding dedicated power converter 802 and 806. When the power state of load 814 is greater than M and/or the power state of load 816 is greater than N, the power supply voltage of the higher power state is selected, and switching assembly 812 are configured by control apparatus 818 to tie all outputs of power converters 802-806 to all inputs of loads 814-816.

Thus, the power-delivery system in the "tied" configuration effectively becomes a single-output power supply that is connected to all loads 814-816. In the "tied" configuration, loads 814-816 may share power at finer levels of granularity than discrete power levels of individual power converters. For example, three 1 W converters that may be split between loads 814-816 in a 2-1 configuration may be shared by loads 814-816 so that each load receives 1.5 W or one load receives 1.2 W and the other load receives 1.8 W. Such sharing of combined power by multiple loads 814-816 may be based on the power draw and/or demand of each load.

The "tied" configuration may also be applied to the MIMO power-delivery systems described above that continuously switch between driving loads based on error signals of the loads. Using the power-delivery system of FIG. 5A as an example, if the power state of one or both loads 508-510 exceeds the power-delivery capabilities of the corresponding dedicated regulators 502 and 504, the outputs of all three regulators 502-506 may be tied to supply power to both loads 508-510. When the power consumed by both loads 508-510 drops below the maximum power that can be supplied by the corresponding dedicated regulators 502 and 504, the power-delivery system may revert to coupling high-efficiency regulator 506 to the load from loads 508-510 with the largest error signal.

Those skilled in the art will appreciate that the power-delivery systems of FIGS. 7A-7B and 8A-8B may be adapted to different types, numbers, and configurations of power converters (e.g., power converters 702-710 and 802-806), loads (e.g., loads 714-716 and 814-816), and switching mechanisms (e.g., switching assemblies 712 and 812 and switches 808-810 and 820-822). For example, different combinations of high-efficiency converter, high-power converters, and/or other types of power converters may be coupled to different numbers or types of loads in various shared and/or dedicated configurations to optimize for power delivery in a portable electronic device. Similarly, the types of power converters and/or components in the power converters may be selected to accommodate different sizes and/or power states of loads in the portable electronic device. Moreover, switches in switching assembly 712 and 812 may be selected and/or configured to couple the power converters to the loads in different ways. Control apparatuses 718 and 818 may further be implemented using hardware and/or software components to couple the power converters to the loads through various types and arrangements of switching assemblies 712 and 812. Finally, the power-delivery policy used by control apparatus 718 to configure the power-delivery system may be tailored to the power states of the loads, the power output of the power converters, the number of loads, and/or the number of power converters.

Figure 9:
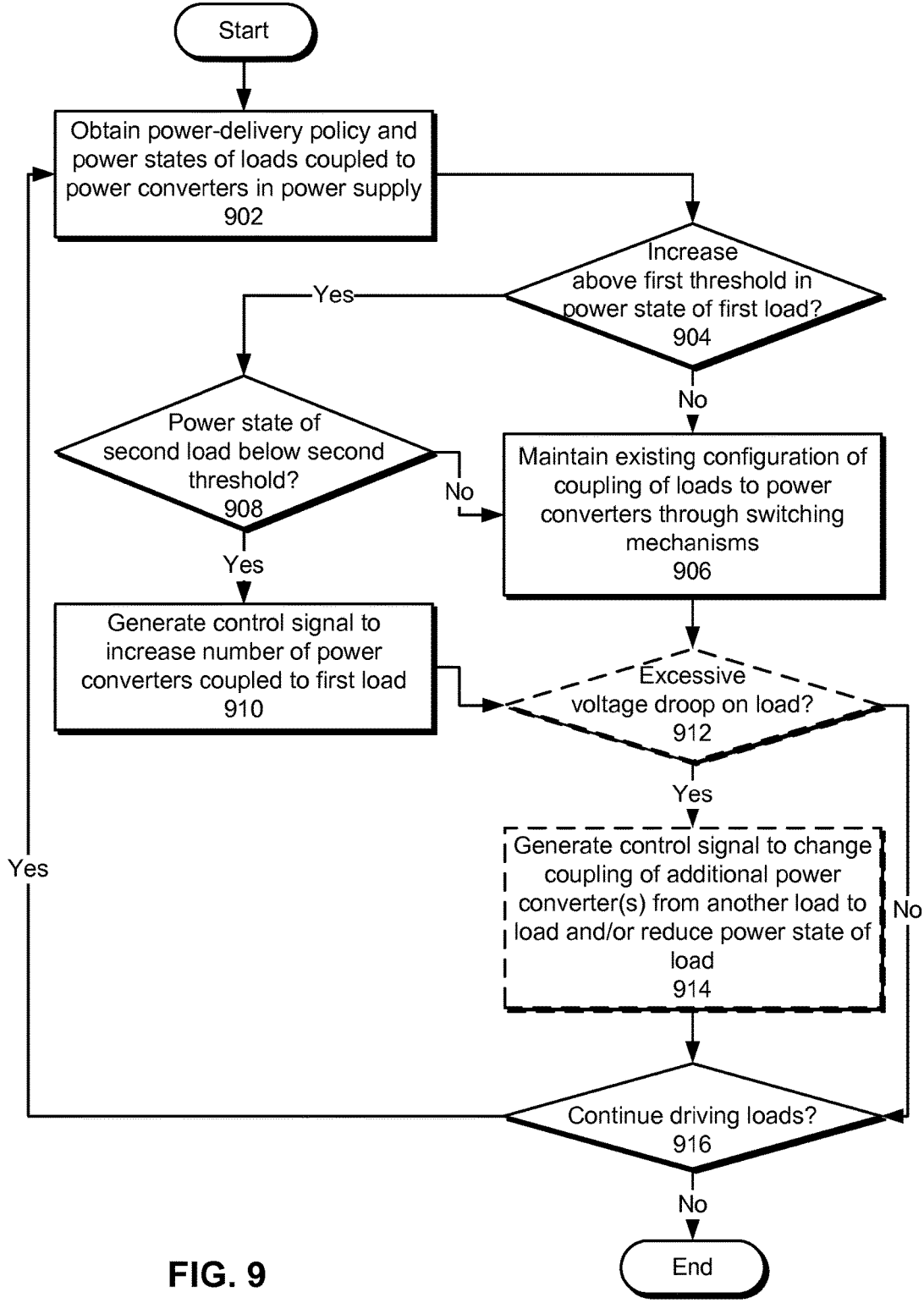
FIG. 9 shows a flowchart illustrating the process of operating a power supply in accordance with the disclosed embodiments.

FIG. 9 shows a flowchart illustrating the process of operating a power supply in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a power-delivery policy for the power supply and power states of two or more loads coupled to two or more voltage regulators in the power supply are obtained (operation 902). The power-delivery policy may be tailored to the types and numbers of loads and/or power converters in a portable electronic device, as well as the power consumption and/or power states of the loads. For example, the power-delivery policy may specify the configuring of the loads and/or the coupling of the loads to the power converters based on the power consumption associated with discrete power states of the loads, the maximum power that can be supplied by the power converters, and/or the maximum power that can be drawn from the loads.

Next, one or more control signals for the loads and/or a set of switching mechanisms that couple the loads to the outputs of the power converters is generated based on the power-delivery policy, power states, and/or voltage droops. More specifically, the control signals may be used to couple the loads to the outputs of the power converters through the switching mechanisms based on an increase above a first threshold in the power state of a first load (operation 904). For example, the power state of the first load may increase from a given range of numbers to a higher range of numbers that is represented by the first threshold. In turn, the power consumption of the first load may increase from a first voltage associated with the lower power state that is below the first threshold to a second voltage associated with the higher power state that is above the first threshold.

When an increase in the power state of the first load falls below the first threshold, the existing configuration of the coupling of the loads to the power converters through the switching mechanisms is maintained (operation 906). For example, the first threshold may represent a limit to the power that can be outputted by power converters that are already coupled to the first load. As a result, a power state of the first load that remains below the first threshold may indicate that the increased power consumption of the first load can be accommodated by the power converters coupled to the first load. In turn, the configuration of the switching mechanisms may be maintained to avert power consumption associated with unnecessarily moving the switching mechanisms into a new configuration.

When the power state of the first load increases above the threshold, the coupling of the power converters to the loads may be managed based on the power state of a second load and a second threshold (operation 908). As with the first threshold, the second threshold may represent a limit to the power that can be outputted by power converters that are coupled to the second load. The first and second thresholds may thus be combined to manage the delivery of limited power from the power converters to loads that can demand more power than can be outputted by the power converters.

If the power state of the second load is below the second threshold, a control signal is generated to increase the number of power converters coupled to the first load (operation 910). For example, the control signal may configure the switching mechanisms to couple one or more additional power converters to the first load to accommodate the added power consumption associated with the increased power state. Because the power state of the second load is below the second threshold, the second load may not be impacted by the coupling of the additional power converters to the first load.

If the power state of the second load is above the second threshold, the existing configuration of the coupling of the loads to the power converters through the switching mechanisms is maintained (operation 906). For example, a power state of the second load above the second threshold may represent a power consumption of the second load that cannot accommodate the coupling of additional power converters to the first load. As a result, the existing configuration of the switching mechanisms may be maintained because reconfiguring the switching mechanisms increases the power consumption of the power supply and without alleviating the power demands of both loads.

An increase in the power state of one or more loads to a point that cannot be accommodated by the power converters in the power supply may result in an excessive voltage droop on the load(s) (operation 912) that is optionally monitored to detect excess power demand in the load(s). For example, an increase in the power state of a load that is not accommodated by coupling additional power converters to the load (e.g., due to the use of the power converters by other loads) may produce a voltage droop on the load as the load demands more power than can be produced by power converters coupled to the load. If no voltage droop is found in any of the loads, the loads may continue to be driven (operation 916) based on the power states of the loads and thresholds associated with the power states (operations 902-910).

If an excessive voltage droop on a load is detected, a control signal is optionally generated to change the coupling of one or more additional power converters from another load to the load and/or reduce the power state of the load (operation 914). For example, if the total power drawn by the loads is detected to exceed the maximum power that can be supplied by the power converters, the power state of one or more loads may be reduced until the total power drawn can be accommodated by the power converters. One or more power converters may also be diverted from a first load to a second load if the power state of the second load has increased and/or the power state of the first load can be lowered until the first load no longer requires the power converter(s).

The loads may continue to be driven (operation 916) using the switching mechanism(s) and power converter(s). If the loads are to be driven, the power-delivery policy, power states, and voltage droops are obtained (operation 902) and used to generate control signals that configure the delivery of power from the power converters to the loads and/or the consumption of power by the loads (operations 904-914). Power delivery to the loads through the power converters and switching mechanisms may continue until the power supply is no longer used to drive the loads.

Figure 10A:
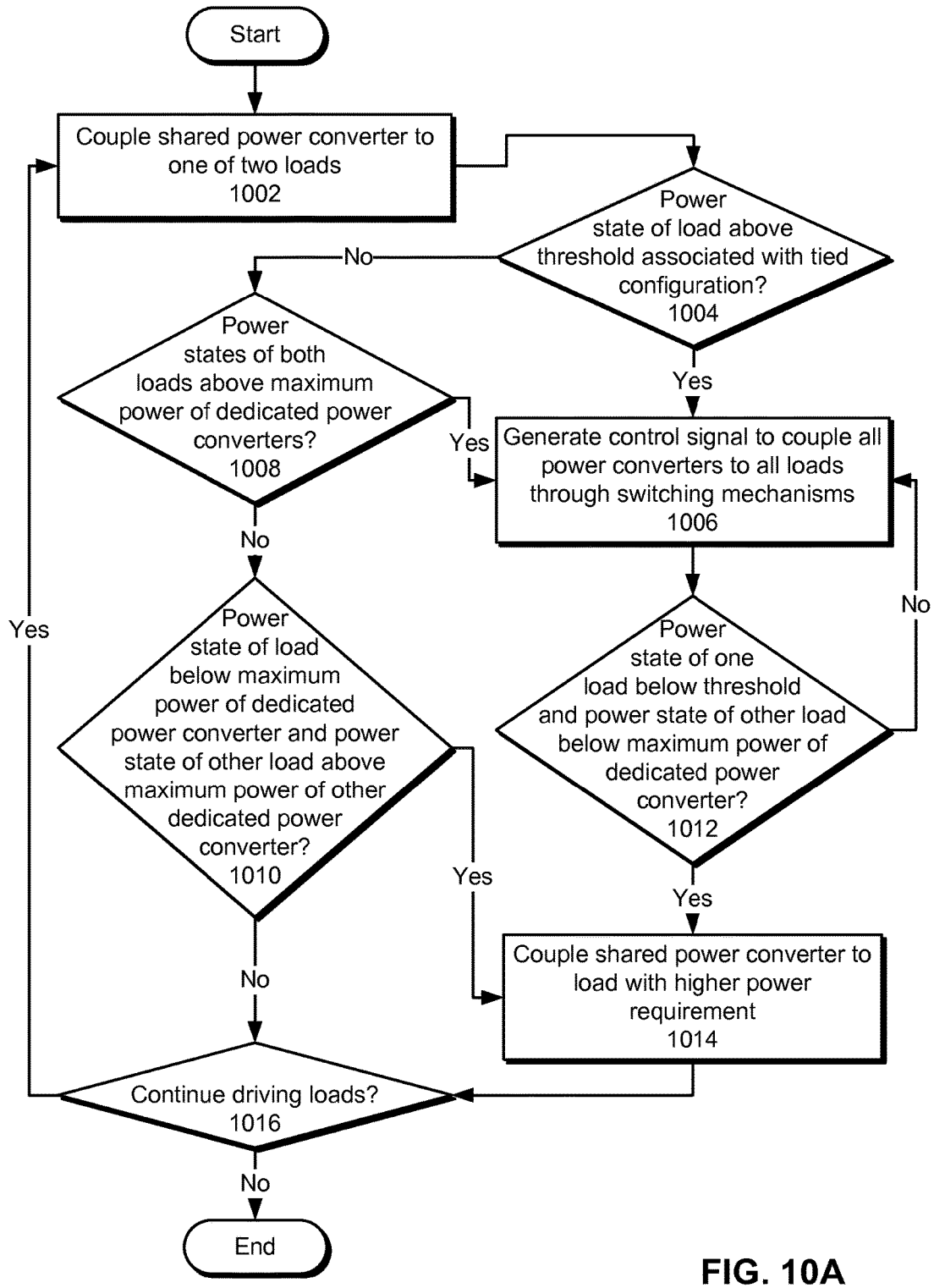
FIG. 10A shows a flowchart illustrating the process of operating a power supply in accordance with the disclosed embodiments.
Figure 10B:
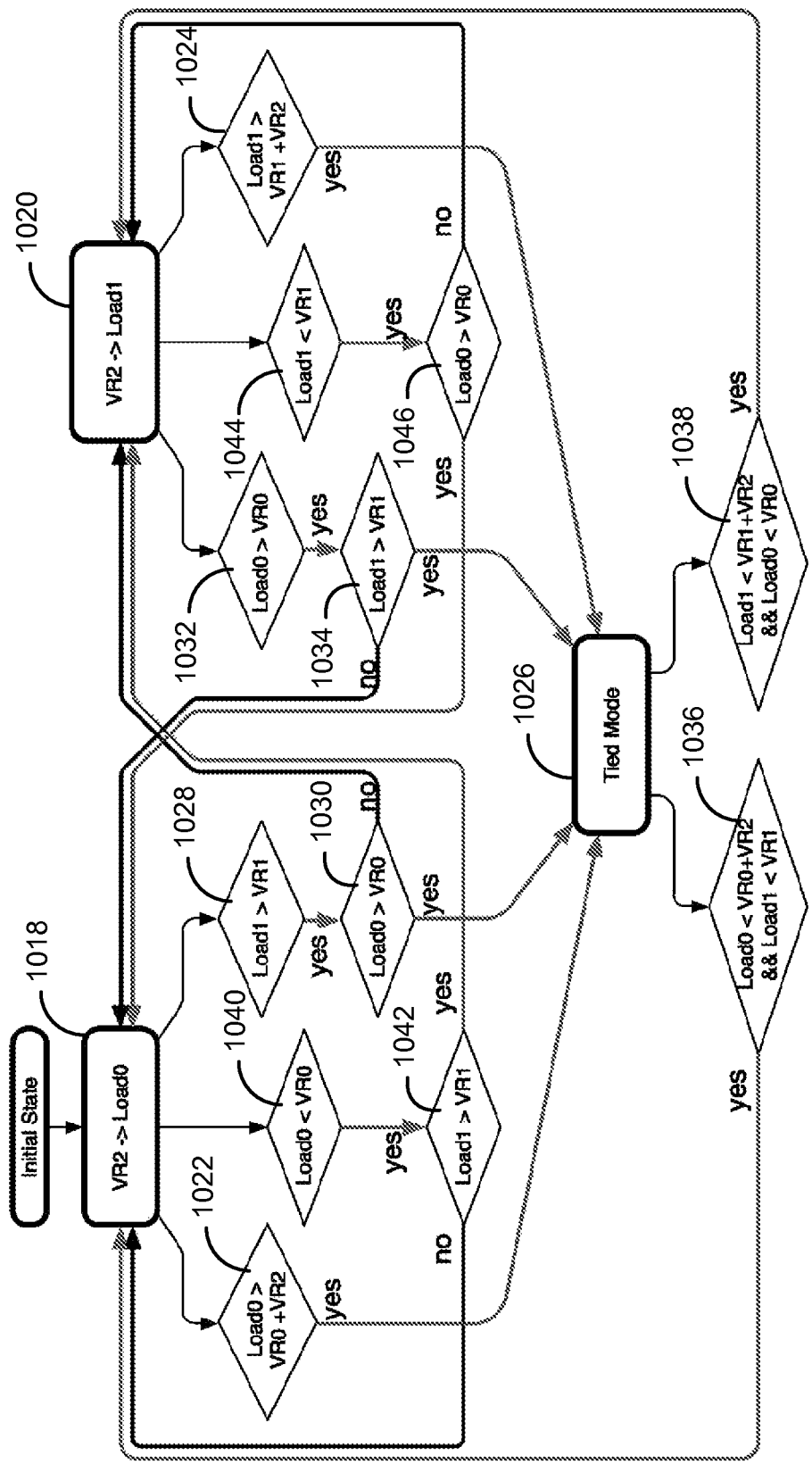
FIG. 10B shows a flowchart illustrating the process of operating a power supply in accordance with the disclosed embodiments.

FIGS. 10A-10B shows a flowchart illustrating the process of operating a power supply in accordance with the disclosed embodiments. More specifically, FIG. 10A shows the operation of a power supply with shared and dedicated power converters, and FIG. 10B shows an exemplary operation of the power supply with two loads "Load0" and "Load1" and three power converters "VR0," "VR1," and "VR2." Power converter 802 may be represented by "VR0," power converter 806 may be represented by "VR1," and power converter 804 may be represented by "VR2." Load 814 may be represented by "Load0," and load 816 may be represented by "Load1." The power supply of FIG. 10B may include the configuration of FIG. 8A or 8B, in which power converter 804 is shared between two loads 814-816 and each load 814-816 is coupled directly to its own dedicated power converter 802 and 806. In one or more embodiments, one or more of the steps may be omitted, repeated, and/or performed in a different order. Accordingly, the specific arrangement of steps shown in FIGS. 10A-1B should not be construed as limiting the scope of the embodiments.

Initially, a shared power converter is coupled to one of two loads (operation 1002). In FIG. 10B, the shared power converter "VR2" may be coupled to "Load0" in step 1018 or to "Load1" in Step 1020. Next, the power supply may be operated based on a comparison of the power state of the load coupled to the shared power converter to a threshold associated with a tied configuration (operation 1004) in the power supply. Each load may be associated with a numeric and/or other threshold that represents the highest power state that can be accommodated by one or more dedicated power converters for the load and the shared power converter.

In other words, if the power drawn by the load is represented by "Load_x," the maximum power that can be supplied by the dedicated power converter for the load is "VR_x," and the maximum power that can be supplied by the shared power converter is "VR_shared," the threshold may be expressed by the following:

$$Load\_x > VR\_x + VR\_shared$$

As shown in FIG. 10B, the threshold associated with the tied configuration may be represented by steps 1022-1024, which follow steps 1018-1020, respectively.

When the power state of the load exceeds the threshold, a control signal is generated to couple all power converters to all loads through the switching mechanisms (operation 1006) in a tied configuration. In FIG. 10B, the tied configuration is represented by step 1026 (e.g., "Tied Mode"). For example, a power supply voltage associated with the highest power state among the loads is selected as the output voltage of the power converters, which is then used to power all loads coupled to the power supply. In other words, the tied configuration may be used to effectively combine the outputs of the power converters into a single output that is used to supply power to all of the loads.

The tied configuration may also be triggered when the power states of both loads are above the maximum power that can be supplied by the corresponding dedicated power converters (operation 1008). For example, if the power drawn by the two loads is represented by "Load_x" and "Load_y," respectively, and the maximum power that can be supplied by the corresponding dedicated power converters is represented by "VR_x" and "VR_y," respectively, the tied configuration may be triggered when the following expression is met:

$$Load\_x > VR\_x \text{ AND } Load\_y > VR\_y$$

If neither of the above conditions in operations 1004 or 1008 is met, the power supply is not operated in the tied configuration. The condition associated with the power states of both loads exceeding the maximum power that can be supplied by the corresponding dedicated converters is shown in steps 1028-1034 in FIG. 10B.

After the power supply enters the tied configuration (operation 1006), the power supply may be kept in the tied configuration until the power state of one load falls below the threshold associated with the tied configuration and the power state of the other load falls below the maximum power that can be delivered by the corresponding dedicated power converter (operation 1012). Using the above representations of power drawn by the loads and the maximum power that can be supplied by the power converters, the power supply may exit the tied configuration when the following expression is met:

$$(Load\_x < VR\_x + VR\_shared \text{ AND } Load\_y < VR\_y)$$

OR $$(Load\_y < VR\_y + VR\_shared \text{ AND } Load\_x < VR\_x)$$

Thresholds that trigger the exit of the power supply from the tied configuration are shown in steps 1036-1038 of FIG. 10B.

To exit the tied configuration, the shared power converter may be coupled to the load with the higher power requirement (operation 1014). For example, the shared power converter may be coupled to the load with the power state that falls below the threshold associated with the tied configuration but not below the maximum power that can be delivered by the corresponding dedicated power converter. On the other hand, if the power states of both loads fall below the maximum power that can be supplied by the corresponding dedicated power converters, the shared power converter may be coupled to the load with the power requirement that is closer to the maximum power of the corresponding dedicated power converter. As shown in FIG.

10B, step 1018 is performed when the condition of step 1036 is met, and step 1020 is performed when the condition of step 1038 is met.

If the power supply is not operated in the tied configuration (e.g., if neither of the conditions in operations 1004 or 1008 is met), the shared power converter may continue to be coupled to the existing load (operation 1002) until the power state of the load falls below the maximum power of the corresponding dedicated power converter and the power state of the other load increases above the maximum power of the other corresponding dedicated power converter (operation 1010). For example, the power requirements of the existing load may be met by the dedicated power converter for the load, while the current drawn by the other load may be higher than the current that can be delivered by one or more other dedicated power converters for the other load.

In turn, the condition of operation 1010 may be detected as a voltage droop on the other load. Using the above representations of power drawn by the loads and the maximum power that can be supplied by the power converters, the power state of the existing load "x" may fall below the maximum power of the corresponding dedicated power converter and the power state of the other load "y" may increase above the maximum power of the other corresponding dedicated power converter when the following expression is met:

$$Load\_x < VR\_x \text{ AND } Load\_y > VR\_y$$

The condition of operation 1010 in FIG. 10A may be expressed using steps 1040-1046 in FIG. 10B.

When the power state of the load falls below the maximum power of the corresponding dedicated power converter and the power state of the other load increases above the maximum power of the other corresponding dedicated power converter, the shared power converter is coupled to the load with the higher power requirement (operation 1014). Put another way, the coupling of the shared power converter is changed from the load in operation 1002 to the other load in operation 1014 to meet the power requirements of the other load when the condition in operation 1010 is met. In FIG. 10B, step 1018 is performed if the conditions in steps 1044-1046 are both true, and step 1020 is performed if the conditions in steps 1040-1042 are both true.

The loads may continue to be driven (operation 1016) using the switching mechanism(s) and power converters. If the loads are to be driven, the shared power converter may be coupled to either load or coupled to both loads in the tied configuration based on the power states of the loads (operations 1004-1014). Power delivery to the loads through the power converters and switching mechanisms may continue until the power supply is no longer used to drive the loads.

Figure 11:
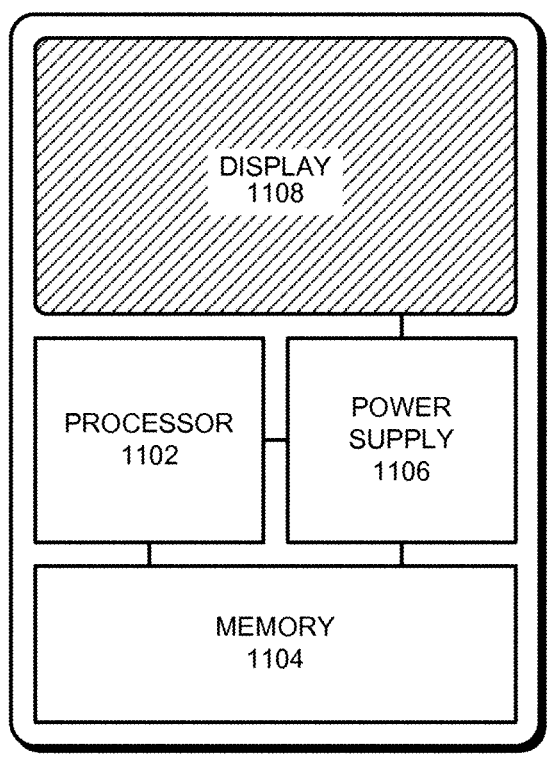
FIG. 11 shows a portable electronic device in accordance with the disclosed embodiments.

The above-described power-delivery system can generally be used in any type of electronic device. For example, FIG. 11 illustrates a portable electronic device 1100 which includes a processor 1102, a memory 1104 and a display 1108, which are all powered by a power supply 1106. Portable electronic device 1100 may correspond to a laptop computer, tablet computer, mobile phone, PDA, portable media player, digital camera, and/or other type of battery-powered electronic device. Power supply 1106 may include one or more power converters and one or more switching mechanisms disposed between the output(s) of the power converter(s) and two or more loads. Power supply 1106 may also include a control circuit that obtains two or more error signals for the loads and uses the switching mechanism(s) to couple the load with a largest error signal from the two or more error signals to the output(s). The control circuit may also use the absolute value of the largest error signal to control the output current(s) of the power converter(s).

Portable electronic device 1100 may also include a software-based control apparatus that obtains power states and voltage droops of the loads and a power-delivery policy for power supply 1106. Next, the control apparatus may generate one or more control signals for the set of switching mechanisms to configure a coupling of the loads to two or more power converters in power supply 1106 through a set of switching mechanisms based on the power states, voltage droops, and/or power-delivery policy.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for operating a power supply, comprising:
obtaining two or more error signals for two or more loads coupled to a first output of a first power converter via a first switching mechanism, wherein each error signal from the two or more error signals represents a difference between a load voltage of a load from the two or more loads and a first reference voltage for the load from a first set of reference voltages for driving the two or more loads using the first power converter; and
using the first switching mechanism to couple the load with a largest error signal from the two or more error signals to the first output.

2. The method of claim 1, further comprising:
generating a control signal for controlling an output current of the first power converter using at least one of:
a largest value of a half-wave-rectified error signal from the two or more error signals;
a sum of positive error signals from the two or more error signals; and
an on-duration of a logical disjunction signal generated from the two or more error signals.

3. The method of claim 2, wherein the output current is proportional to the control signal.

4. The method of claim 1, further comprising:
uncoupling the first power converter from the two or more loads upon detecting a higher load voltage for each load from the two or more loads than the first reference voltage for driving the load from the two or more loads.

5. The method of claim 1, further comprising:
upon detecting a lower load voltage of the load than a second reference voltage for the load from a second set of reference voltages for driving the two or more loads using a second power converter, engaging the second power converter to supplement the lower load voltage with an output voltage from a second output of the second power converter.

6. The method of claim 5, further comprising:
using a second switching mechanism disposed between the second output and the two or more loads to couple the load with the largest error signal to the second output.

7. The method of claim 6,
wherein the first power converter has a higher efficiency than the second power converter, and
wherein the second power converter has a higher power than the first power converter.

8. The method of claim 7,
wherein a first switching frequency is used by the first switching mechanism to couple the load with the largest error signal to the first output, and
wherein a second switching frequency that is higher than the first switching frequency is used by the second switching mechanism to couple the load with the largest error signal to the second output.

9. The method of claim 7, wherein the first reference voltage for the load is higher than the second reference voltage for the load.

10. The method of claim 1, wherein the two or more error signals comprise two or more request signals obtained from two or more comparators.

11. The method of claim 10, wherein using the first switching mechanism to couple the load with the largest error signal to the first output comprises:
coupling the first output to the load associated with a comparator from the two or more comparators that first asserts a request signal representing a lower load voltage for the load than the reference voltage for the load; and
maintaining coupling of the first output to the load for a minimum pre-specified time.

12. A power supply, comprising:
a first power converter with a first output;
a first switching mechanism disposed between the first output and two or more loads; and
a control circuit configured to:
obtain two or more error signals for the two or more loads, wherein each error signal from the two or more error signals represents a difference between a load voltage of a load from the two or more loads and a first reference voltage for the load from a first set of reference voltages for driving the two or more loads using the first power converter; and
use the first switching mechanism to couple the load with a largest error signal from the two or more error signals to the first output.

13. The power supply of claim 12, further comprising:
a second power converter with a second output for driving at least one of the two or more loads,
wherein upon detecting a lower load voltage of the load than a second reference voltage for the load from a second set of reference voltages for driving the two or more loads using the second power converter, the control circuit is further configured to engage the second power converter to supplement the lower load voltage with an output voltage from the second output.

14. The power supply of claim 13, further comprising:
a second switching mechanism disposed between the second output and the two or more loads,
wherein the control circuit is further configured to use the second switching mechanism to couple the load with the largest error signal to the second output.

15. The power supply of claim 14, wherein the control circuit comprises:
a first sub-circuit configured to control the first power converter and the first switching mechanism; and
a second sub-circuit configured to control the second power converter and the second switching mechanism.

16. The power supply of claim 13,
wherein the first power converter has a higher efficiency than the second power converter, and
wherein the second power converter has a higher power than the first power converter.

17. The power supply of claim 13, wherein the first reference voltage for the load is higher than the second reference voltage for the load.

18. The power supply of claim 12, wherein the control circuit is further configured to:
generate a control signal for controlling an output current of the first power converter using at least one of:
a largest value of a half-wave-rectified error signal from the two or more error signals;
a sum of positive error signals from the two or more error signals; and
an on-duration of a logical disjunction signal generated from the two or more error signals.

19. The power supply of claim 18, wherein the output current is proportional to the control signal.

20. The power supply of claim 12, wherein the two or more error signals comprise two or more request signals obtained from two or more comparators.

21. A portable electronic device, comprising:
a set of components; and
a power supply configured to supply power to the components, wherein the power supply comprises:
a first power converter with a first output;
a first switching mechanism disposed between the first output and two or more loads; and
a control circuit configured to:
obtain two or more error signals for the two or more loads, wherein each error signal from the two or more error signals represents a difference between a load voltage of a load from the two or more loads and a first reference voltage for the load from a first set of reference voltages for driving the two or more loads using the first power converter; and
use the first switching mechanism to couple the load with a largest error signal from the two or more error signals to the first output.

22. The portable electronic device of claim 21, wherein the power supply further comprises:
a second power converter with a second output for driving at least one of the two or more loads,
wherein upon detecting a lower load voltage of the load than a second reference voltage for the load from a second set of reference voltages for driving the two or more loads using the second power converter, the control circuit is further configured to engage the second power converter to supplement the lower load voltage with an output voltage from the second output.

23. The portable electronic device of claim 22, wherein the power supply further comprises:
a second switching mechanism disposed between the second output and the two or more loads,
wherein the control circuit is further configured to use the second switching mechanism to couple the load with the largest error signal to the second output.

24. The portable electronic device of claim 22, wherein the control circuit is further configured to:
upon detecting an increase above a threshold in a power state of a load in the two or more loads, generating a control signal to couple all of the first and second power converters to all of the two or more loads through the first and second switching mechanisms.

* * * * *